(12) United States Patent
Li et al.

(10) Patent No.: US 10,176,196 B2
(45) Date of Patent: **\*Jan. 8, 2019**

(54) SYSTEM, METHOD AND APPARATUS FOR SCENE RECOGNITION

(71) Applicant: Amazon Technologies, Inc., Seattle, WA (US)

(72) Inventors: Yi Li, Mountain View, CA (US); Tianqiang Liu, Mountain View, CA (US); Hao Chen, Allston, MA (US); Meng Wang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,232

(22) Filed: Jun. 23, 2015

(65) Prior Publication Data

US 2015/0286638 A1 Oct. 8, 2015

Related U.S. Application Data

(63) Continuation of application No. 14/074,594, filed on Nov. 7, 2013, now Pat. No. 9,129,148.

(51) Int. Cl.
| | |
|---|---|
| *G06F 17/30* | (2006.01) |
| *G06K 9/00* | (2006.01) |
| *G06K 9/52* | (2006.01) |
| *G06K 9/62* | (2006.01) |

(52) U.S. Cl.
CPC .... *G06F 17/30244* (2013.01); *G06F 17/3028* (2013.01); *G06F 17/30424* (2013.01); *G06F 17/30864* (2013.01); *G06K 9/00248* (2013.01); *G06K 9/00268* (2013.01); *G06K 9/00288* (2013.01); *G06K 9/00302* (2013.01); *G06K 9/00624* (2013.01); *G06K 9/00684* (2013.01); (Continued)

(58) Field of Classification Search
CPC ........ G06T 2207/10016; G06T 7/0081; G06K 9/00228; G06K 9/00; G06K 9/00295; G06K 9/00711; G06K 9/6255
USPC .......................... 382/118, 164, 173, 103, 181
See application file for complete search history.

(56) References Cited

U.S. PATENT DOCUMENTS

| | | |
|---|---|---|
| 5,982,912 A | 11/1999 | Fukui et al. |
| 6,044,168 A | 3/2000 | Tuceryan et al. |
| 7,114,079 B1 | 9/2006 | Cook et al. |

(Continued)

OTHER PUBLICATIONS

"Machine Learning, An Algorithmic Perspective," Chapters 3,8,10,15, pp. 47-90, 167-192, 221-245, 333-361, Marsland, CRC Press, 2009.

(Continued)

*Primary Examiner* — Ruiping Li
(74) *Attorney, Agent, or Firm* — Lee & Hayes, PLLC

(57) ABSTRACT

An image processing system for recognizing the scene type of an input image generates an image distance metric from a set of images. The image processing system further extracts image features from the input image and each image in the set of images. Based on the distance metric and the extracted image features, the image processing system computes image feature distances for selecting a subset of images. The image processing system derives a scene type from the scene type of the subset of images. In one embodiment, the image processing system is a cloud computing system.

20 Claims, 30 Drawing Sheets

(52) U.S. Cl.
CPC .......... *G06K 9/00979* (2013.01); *G06K 9/52* (2013.01); *G06K 9/6201* (2013.01); *G06K 9/6267* (2013.01)

(56) References Cited

U.S. PATENT DOCUMENTS

| | | | |
|---|---|---|---|
| 7,764,828 | B2 | 7/2010 | Sasaki et al. |
| 8,131,023 | B2 | 3/2012 | Ishikawa |
| 8,345,937 | B2 | 1/2013 | Suzuki et al. |
| 8,369,570 | B2 | 2/2013 | Myers et al. |
| 8,861,804 | B1 | 10/2014 | Johnson |
| 9,210,313 | B1 | 12/2015 | Svendsen |
| 9,251,588 | B2 | 2/2016 | Muninder et al. |
| 2001/0041020 | A1 | 11/2001 | Shaffer et al. |
| 2004/0022432 | A1 | 2/2004 | Hayata et al. |
| 2004/0047494 | A1 | 3/2004 | Lee et al. |
| 2006/0018521 | A1 | 1/2006 | Avidan |
| 2006/0115157 | A1 | 6/2006 | Mori et al. |
| 2006/0210125 | A1 | 9/2006 | Heisele |
| 2006/0251339 | A1 | 11/2006 | Gokturk et al. |
| 2008/0298643 | A1 | 12/2008 | Lawther et al. |
| 2009/0087035 | A1 | 4/2009 | Wen et al. |
| 2009/0175512 | A1 | 7/2009 | Hyuga et al. |
| 2009/0185723 | A1 | 7/2009 | Kurtz et al. |
| 2009/0313294 | A1 | 12/2009 | Mei et al. |
| 2009/0316962 | A1 | 12/2009 | Sun et al. |
| 2010/0290668 | A1 | 11/2010 | Friedman et al. |
| 2011/0007174 | A1 | 1/2011 | Bacivarov et al. |
| 2011/0013038 | A1 | 1/2011 | Kim et al. |
| 2011/0064302 | A1 | 3/2011 | Ma et al. |
| 2011/0141257 | A1 | 6/2011 | Hwang et al. |
| 2011/0280485 | A1 | 11/2011 | Sairyo |
| 2012/0033875 | A1* | 2/2012 | Bergman .............. G06T 7/0081 382/164 |
| 2012/0051658 | A1 | 3/2012 | Tong et al. |
| 2013/0266193 | A1 | 10/2013 | Tiwari et al. |
| 2014/0003737 | A1 | 1/2014 | Fedorovskaya et al. |
| 2014/0010419 | A1 | 1/2014 | Irie |
| 2014/0026102 | A1 | 1/2014 | Kinn |
| 2014/0337341 | A1 | 11/2014 | Tseng |
| 2016/0292494 | A1 | 10/2016 | Ganong et al. |

OTHER PUBLICATIONS

"Detecting Faces in Images: A Survey," Ming-Hsuan Yang, et al., IEEE Transactions on Pattern Analysis and machine Intelligence, vol. 24, No. 1, Jan. 2002.

"Rapid Object Detection using a Boosted Cascade of Simple Features," Paul Viola, et al., Computer Vision and Pattern Recognition 2001, IEEE Computer Society Conference, vol. 1., 2001.

"Learning Deep Architectures for AI," Yoshua Bengio, Foundations and Trends in Machine Learning, vol. 2, No. 1, 2009.

"Machine Learning and Pattern Recognition Principal Component Analysis," David Barber, 2004.

"Distance Metric Learning: A Comprehensive Survey," Liu Yang, May 19, 2006.

"Adaptive Background Mixture Models for Real-Time Tracking," Chris Stauffer, W.E.L Grimson, The Artificial Intelligence Laboratory, Massachusetts Institute of Technology.

"Segmenting Foreground Objects from a Dynamic Textured Background via a Robust Kalman Filter," Jing Zhong and Stan Sclaroff, Proceedings of the Ninth IEEE International Conference on Computer Vision (ICCV 2003) 2-Volume Set 0-7695-1950-4/03.

"Saliency, Scale and Image Description," Timor Kadir, Michael Brady, International Journal of Computer Vision 45(2), 83-105, 2001.

"GrabCut—Interactive Foreground Extraction using Iterated Graph Cuts," Carsten Rother, Vladimir Kolmogorov, Andrew Blake, ACM Transactions on Graphics (TOG), 2004.

"Artificial Intelligence, a Modern Approach," Chapter 23, pp. 691-719, Russell, Prentice Hall, 1995.

"Normalized Cuts and Image Segmentation," Jianbo Shi and Jitendra Malik, IEEE Transactions on Pattern Analysis and Machine Intelligence, vol. 22, No. 8, Aug. 2000.

Office action for U.S. Appl. No. 14/074,575, dated Dec. 3, 2015, Li et al., "System and Method for Automatically Generating Albums", 13 pages.

Office action for U.S. Appl. No. 141749,465 dated May 1, 2017, Li et al. "System, Method and Apparatus for Facial Recognition", 11 pages.

Office action for U.S. Appl. No. 14/749,465 dated May 25, 2016, Li et al. "System, Method and Apparatus for Facial Recognition", 12 pages.

Office action for U.S. Appl. No. 14/749,465, dated Sep. 10, 2015, Li et al., " System, Method and Apparatus for Facial Recognition", 8 pages.

Office action for U.S. Appl. No. 14/749,465, dated Sep. 15, 2016, Li et al., " System, Method and Apparatus for Facial Recognition", 10 pages.

* cited by examiner

SYSTEM, METHOD AND APPARATUS FOR SCENE RECOGNITION

CROSS REFERENCE TO RELATED APPLICATIONS

This application is a continuation application of co-pending U.S. patent application Ser. No. 14/074,594, entitled "SYSTEM, METHOD AND APPARATUS FOR SCENE RECOGNITION," filed Nov. 7, 2013, assigned to Orbeus, Inc. of Sunnyvale, Calif., which is hereby incorporated by reference in its entirety to provide continuity of disclosure, and which claims the benefit and priority of U.S. Patent Application No. 61/724,628, entitled "SYSTEM, METHOD AND APPARATUS FOR SCENE RECOGNITION," filed Nov. 9, 2012, assigned to Orbeus, Inc. of Sunnyvale, Calif., which also claims the benefit and priority of U.S. Patent Application No. 61/837,210, entitled "SYSTEM, METHOD AND APPARATUS FOR FACIAL RECOGNITION," filed Jun. 20, 2013, assigned to Orbeus, Inc. of Sunnyvale, Calif. This application is also related to U.S. patent application Ser. No. 14/074,615, entitled "SYSTEM AND METHOD FOR FACIAL RECOGNITION," filed Nov. 7, 2013, assigned to Orbeus, Inc. of Sunnyvale, Calif., and which is hereby incorporated by reference. This application is further related to U.S. patent application Ser. No. 14/074,575, entitled "SYSTEM AND METHOD FOR AUTOMATICALLY GENERATING ALBUMS," filed Nov. 7, 2013, assigned to Orbeus, Inc. of Sunnyvale, Calif., and which is hereby incorporated by reference.

FIELD OF THE DISCLOSURE

The present invention relates to computer based image recognition, and more particularly relates to a system and method for recognizing a face or scene within an image. More particularly still, the present disclosure relates to a system and method for categorizing and presenting images in groups based on image recognition result, metadata and tags.

DESCRIPTION OF BACKGROUND

Image recognition is a process, performed by computers, to analyze and understand an image (such as a photo or video clip). Images are generally produced by sensors, including light sensitive cameras. Each image includes a large number (such as millions) of pixels. Each pixel corresponds to a specific location in the image. Additionally, each pixel typically corresponds to light intensity in one or more spectral bands, physical measures (such as depth, absorption or reflectance of sonic or electromagnetic waves), etc. Pixels are typically represented as color tuples in a color space. For example, in the well-known Red, Green, and Blue (RGB) color space, each color is generally represented as a tuple with three values. The three values of a RGB tuple expresses red, green, and blue lights that are added together to produce the color represented by the RGB tuple.

In addition to the data (such as color) that describes pixels, image data may also include information that describes an object in an image. For example, a human face in an image may be a frontal view, a left view at 30°, or a right view at 45°. As an additional example, an object in an image is an automobile, instead of a house or an airplane. Understanding an image requires disentangling symbolic information represented by image data. Specialized image recognition technologies have been developed to recognize colors, patterns, human faces, vehicles, air crafts, and other objects, symbols, forms, etc., within images.

Scene understanding or recognition has also advanced in recent years. A scene is a view of a real-world surrounding or environment that includes more than one object. A scene image can contain a big number of physical objects of various types (such as human beings, vehicle). Additionally, the individual objects in the scene interact with or relate to each other or their environment. For example, a picture of a beach resort may contain three objects—a sky, a sea, and a beach. As an additional example, a scene of a classroom generally contains desks, chairs, students, and a teacher. Scene understanding can be extremely beneficial in various situations, such as traffic monitoring, intrusion detection, robot development, targeted advertisement, etc.

Facial recognition is a process by which a person within a digital image (such as a photograph) or video frame(s) is identified or verified by a computer. Facial detection and recognition technologies are widely deployed in, for example, airports, streets, building entrances, stadia, ATMs (Automated Teller Machines), and other public and private settings. Facial recognition is usually performed by a software program or application running on a computer that analyzes and understands an image.

Recognizing a face within an image requires disentangling symbolic information represented by image data. Specialized image recognition technologies have been developed to recognize human faces within images. For example, some facial recognition algorithms recognize facial features by extracting features from an image with a human face. The algorithms may analyze the relative position, size and shape of the eyes, nose, mouth, jaw, ears, etc. The extracted features are then used to identify a face in an image by matching features.

Image recognition in general and facial and scene recognition in particular have been advanced in recent years. For example, Principal Component Analysis ("PCA") algorithm, Linear Discriminant Analysis ("LDA") algorithm, Leave One Out Cross-Validation ("LOOCV") algorithm, K Nearest Neighbors ("KNN") algorithm, and Particle Filter algorithm have been developed and applied for facial and scene recognition. Descriptions of these example algorithms are more fully described in "Machine Learning, An Algorithmic Perspective," Chapters 3, 8, 10, 15, Pages 47-90, 167-192, 221-245, 333-361, Marsland, CRC Press, 2009, which is hereby incorporated by reference to materials filed herewith.

Despite the development in recent years, facial recognition and scene recognition have proved to present a challenging problem. At the core of the challenge is image variation. For example, at the same place and time, two different cameras typically produce two pictures with different light intensity and object shape variations, due to difference in the camera themselves, such as variations in the lenses and sensors. Additionally, the spatial relationship and interaction between individual objects have an infinite number of variations. Moreover, a single person's face may be cast into an infinite number of different images. Present facial recognition technologies become less accurate when the facial image is taken at an angle more than 20° from the frontal view. As an additional example, present facial recognition systems are ineffective to deal with facial expression variation.

A conventional approach to image recognition is to derive image features from an input image, and compare the derived image features with image features of known images. For example, the conventional approach to facial recognition is to derive facial features from an input image, and compare the derived image features with facial features of known images. The comparison results dictate a match between the input image and one of the known images. The conventional approach to recognize a face or scene generally sacrifices matching accuracy for recognition processing efficiency or vice versa.

People manually create photo albums, such as a photo album for a specific stop during a vacation, a weekend visitation of a historical site or a family event. In today's digital world, the manual photo album creation process proves to be time consuming and tedious. Digital devices, such as smart phones and digital cameras, usually have large storage size. For example, a 32 gigabyte ("GB") storage card allows a user to take thousands of photos, and record hours of video. Users oftentimes upload their photos and videos onto social websites (such as Facebook, Twitter, etc.) and content hosting sites (such as Dropbox and Picassa) for sharing and anywhere access. Digital camera users covet for an automatic system and method to generate albums of photos based certain criteria. Additionally, users desire to have a system and method for recognizing their photos, and automatically generating photo albums based on the recognition results.

Accordingly, there is a need for a system, apparatus and method for providing accurate and fast facial and scene recognition. Furthermore, there is a need for a system, apparatus and method for automatically generating photo albums based on image recognition results. Additionally, it is desirable that the automatic generation of photo albums factors in metadata embedded in and tags attached to the photos.

Objects of the Disclosed System, Method, and Apparatus

Accordingly, it is an object of this disclosure to provide a system, apparatus and method for recognizing the scene category of a scene image.

Another object of this disclosure is to provide a system, apparatus and method for matching a scene image to an image stored in a database.

Another object of this disclosure is to provide a system, apparatus and method for efficiently and accurately understanding a scene through an iterative process.

Another object of this disclosure is to provide a system, apparatus and method for segmenting a scene image into multiple images, recognizing each of the multiple images, and, based on the recognition results, matching the scene image to a scene category in a set of scene categories.

Another object of this disclosure is to provide a system, apparatus and method for segmenting a scene image into multiple images, recognizing each of the multiple images, and, based on the recognition results, matching the scene image to an image in a set of images.

Another object of this disclosure is to provide a system, apparatus and method for deriving raw image features and selecting significant image features from the raw image features for training images.

Another object of this disclosure is to provide a system, apparatus and method for deriving image features from training images.

Another object of this disclosure is to provide a system, apparatus and method for refining scene understanding using an iterative training process.

Another object of this disclosure is to provide a system, apparatus and method for recognizing a scene image using a client-server computing platform.

Another object of this disclosure is to provide a system, apparatus and method for recognizing a scene image using a client-server computing platform in an offline mode.

Another object of this disclosure is to provide a system, apparatus and method for recognizing a scene image using a cloud computing platform.

Another object of this disclosure is to provide a system, apparatus and method for organizing images by scene types.

Another object of this disclosure is to provide a system, apparatus and method for associating a scene type with photos on a web page.

Another object of this disclosure is to provide a system, apparatus and method for associating a scene type with a web video clip.

Another object of this disclosure is to provide a system, apparatus and method for crawling social network sites for facial recognition and model training on photos hosted on the social network sites.

Another object of this disclosure is to provide a system, apparatus and method for recognizing a face in a set of images.

Another object of this disclosure is to provide a system, apparatus and method for recognizing a face in a video clip.

Another object of this disclosure is to provide a system, apparatus and method for training models using a video clip.

Another object of this disclosure is to provide a system, apparatus and method for detecting a face within an image using deep learning algorithms.

Another object of this disclosure is to provide a system, apparatus and method for performing facial recognition by detecting facial feature points, extracting partial facial features, and concatenating partial facial features.

Another object of this disclosure is to provide a system, apparatus and method for performing facial recognition using metric learning algorithms.

Another object of this disclosure is to provide a system, apparatus and method for facial recognition that supports different facial recognition mechanisms depending on facial recognition time requirements.

Another object of this disclosure is to provide a system, apparatus and method for facial recognition that corrects and improves facial recognition results.

Another object of this disclosure is to provide a system, apparatus and method for facial recognition using a client-server based facial recognition system.

Another object of this disclosure is to provide a system, apparatus and method for facial recognition using a client-server based parallel facial recognition system.

Another object of this disclosure is to provide a system, apparatus and method for facial recognition using a cloud based facial recognition system.

Another object of this disclosure is to provide a system, apparatus and method for uploading batch images for facial recognition.

Another object of this disclosure is to provide a system, apparatus and method

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides an image processing system for recognizing a scene within an image. In accordance with the present teachings, the image processing system includes software that is adapted to operate on the image processing system. The software adapted to generate an image distance metric from a set of images, and retrieve an input image. Additionally, the software is adapted to extract a set of input image features from the input image. The set of input image features corresponds to the distance metric. The software is also adapted to extract a set of image features from each image in the set of images. Each of the extracted sets of image features corresponds to the distance metric. Moreover, using the distance metric, the software is adapted to compute an image feature distance between the set of input image features and each of the extracted sets of image features, and select, from the set of images, a subset of images based on the computed image feature distances. Furthermore, the software is adapted to determine a scene type from the scene types of the subset of images, and assign the determined scene type to the input image.

Further in accordance with the present teachings is method for recognizing a scene type of an image. The method operates within an image processing computer and includes generating an image distance metric from a set of images. The set of images are retrieved via the network interface of the image processing computer; and the image distance metric is a metric of image feature weights. The method also includes retrieving an input image via the network interface, and extracting a set of input image features from the input image. The set of input image features corresponds to the distance metric. Furthermore, the method includes extracting a set of image features from each image in the set of images. Each of the extracted sets of image features corresponds to the distance metric. Additionally, the method includes computing an image feature distance between the set of input image features and each of the extracted sets of image features using the distance metric, and selecting, from the set of images, a subset of images based on the computed image feature distances. Moreover, the method includes determining a scene type from the scene types of the subset of images; and assigning the determined scene type to the input image.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 31 is a flowchart depicting a process by which an image processing computer generates an album of photos based on photo search results in accordance with the teachings of this disclosure; and FIG. 32 is a flowchart depicting a process by which an image processing computer automatically generates an album of photos in accordance with the teachings of this disclosure.

DETAILED DESCRIPTION

Figure 1:
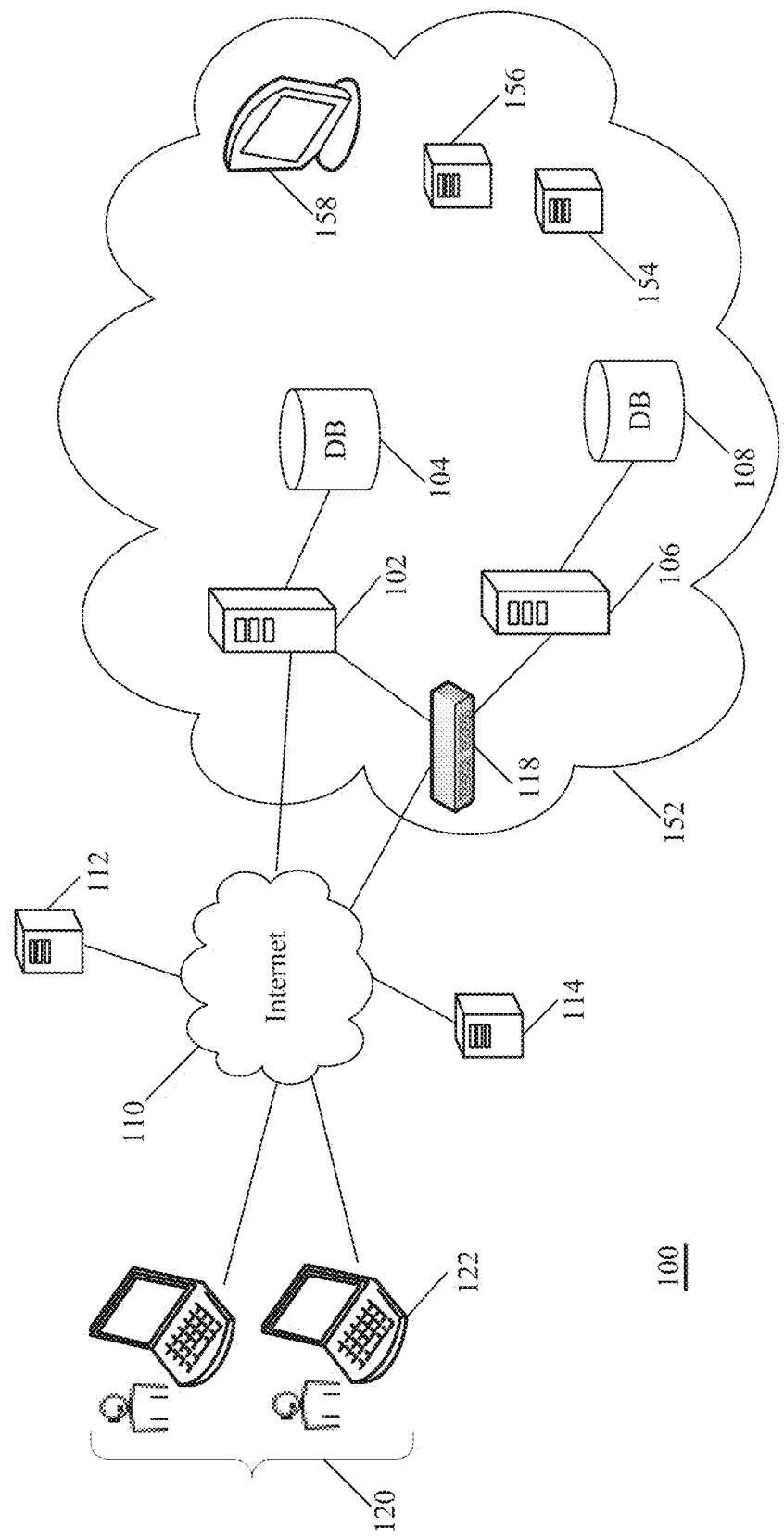
FIG. 1 is a simplified block diagram of a facial recognition system constructed in accordance with this disclosure.

Turning to the Figures and to FIG. 1 in particular, a facial recognition system 100 for recognizing or identifying a face within one or more images is shown. The system 100 includes a facial recognition server computer 102 coupled to a database 104 which stores images, image features, recognition facial models (or models for short), and labels. A label (such as a unique number or name) identifies a person and/or the face of the person. Labels can be represented by data structures in the database 104. The computer 102 comprises one or more processors, such as, for example, any of the variants of the Intel Xeon family of processors, or any of the variants of the AMD Opteron family of processors. In addition, the computer 102 includes one or more network interfaces, such as, for example, a Gigabit Ethernet interface, some amount of memory, and some amount of storage, such as a hard drive. In one implementation, the database 104 stores, for example, a large number of images, image features and models derived from the images. The computer 102 is further coupled to a wide area network, such as the Internet 110.

As used herein, an image feature denotes a piece of information of an image and typically refers to a result of an operation (such as feature extraction or feature detection) applied to the image. Example image features are a color histogram feature, a Local Binary Pattern ("LBP") feature, a Multi-scale Local Binary Pattern ("MS-LBP") feature, Histogram of Oriented Gradients ("HOG"), and Scale-Invariant Feature Transform ("SIFT") features.

Figure 15:
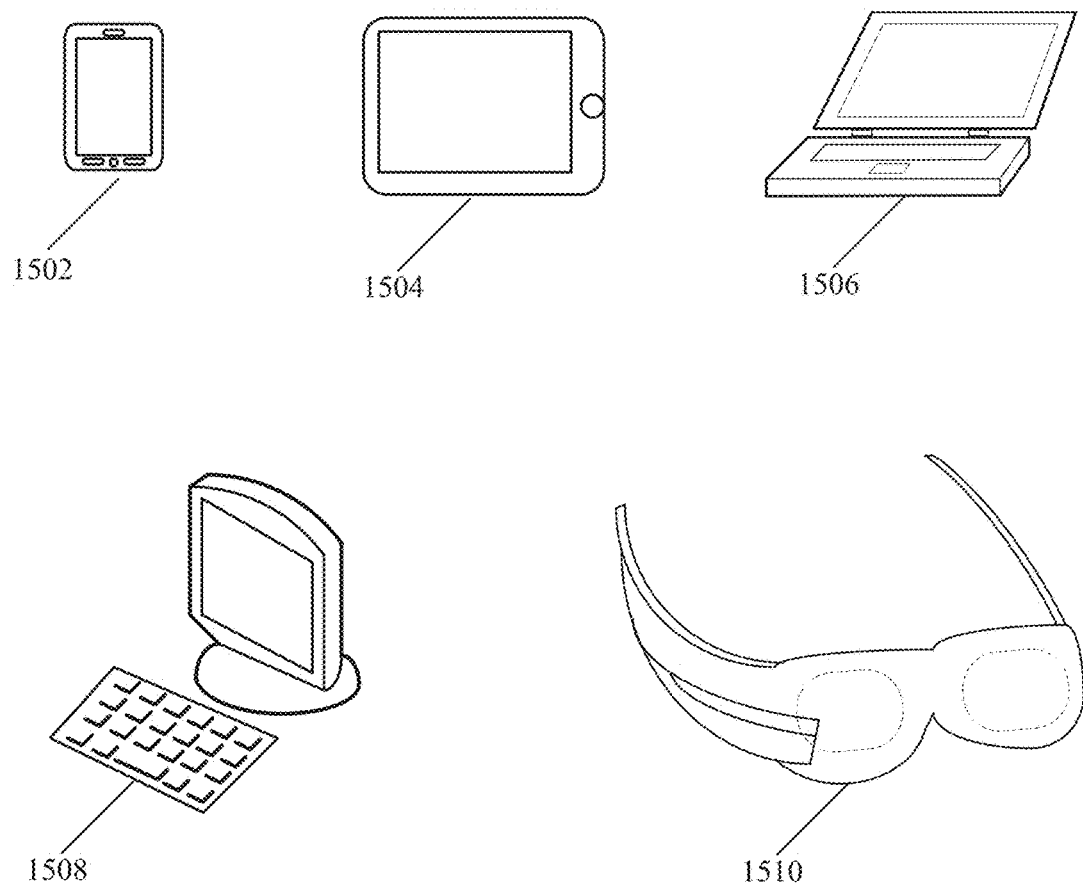
FIG. 15 is a perspective view of client computers in accordance with the teachings of this disclosure.

Over the Internet 110, the computer 102 receives facial images from various computers, such as client or consumer computers 122 (which can be one of the devices pictured in FIG. 15) used by clients (also referred to herein as users) 120. Each of the devices in FIG. 15 includes a housing, a processor, a networking interface, a display screen, some amount of memory (such as 8 GB RAM), and some amount of storage. In addition, the devices 1502 and 1504 each have a touch panel. Alternatively, the computer 102 retrieves facial ages through a direct link, such as a high speed Universal Serial Bus (USB) link. The computer 102 analyzes and understands the received images to recognize faces within the images. Moreover, the computer 102 retrieves or receives a video clip or a batch of images containing the face of a same person for training image recognition models (or models for short).

Furthermore, the facial recognition computer 102 may receive images from other computers over the Internet 110, such as web servers 112 and 114. For example, the computer 122 sends a URL (Uniform Resource Locator) to a facial image, such as a Facebook profile photograph (also interchangeably referred to herein as photos and pictures) of the client 120, to the computer 102. Responsively, the computer 102 retrieves the image pointed to by the URL, from the web server 112. As an additional example, the computer 102 requests a video clip, containing a set (meaning one or more) of frames or still images, from the web server 114. The web server 114 can be any server(s) provided by a file and storage hosting service, such as Dropbox. In a further embodiment, the computer 102 crawls the web servers 112 and 114 to retrieve images, such as photos and video clips. For example, a program written in Perl language can be executed on the computer 102 to crawl the Facebook pages of the client 120 for retrieving images. In one implementation, the client 120 provides permission for accessing his Facebook or Dropbox account.

In one embodiment of the present teachings, to recognize a face within an image, the facial recognition computer 102 performs all facial recognition steps. In a different implementation, the facial recognition is performed using a client-server approach. For example, when the client computer 122 requests the computer 102 to recognize a face, the client computer 122 generates certain image features from the image and uploads the generated image features to the computer 102. In such a case, the computer 102 performs facial recognition without receiving the image or generating the uploaded image features. Alternatively, the computer 122 downloads predetermined image features and/or other image feature information from the database 104 (either directly or indirectly through the computer 102). Accordingly, to recognize the face in the image, the computer 122 independently performs facial recognition. In such a case, the computer 122 avoids uploading images or image features onto the computer 102.

In a further implementation, facial recognition is performed in a cloud computing environment 152. The cloud 152 may include a large number and different types of computing devices that are distributed over more than one geographical area, such as Each Coast and West Coast states of the United States. For example, a different facial recognition server 106 is accessible by the computers 122. The servers 102 and 106 provide parallel facial recognition. The server 106 accesses a database 108 that stores images, image features, models, user information, etc. The databases 104, 108 can be distributed databases that support data replication, backup, indexing, etc. In one implementation, the database 104 stores references (such as physical paths and file names) to images while the physical images are files stored outside of the database 104. In such a case, as used herein, the database 104 is still regarded as storing the images. As an additional example, a server 154, a workstation computer 156, and a desktop computer 158 in the cloud 152 are physically located in different states or countries and collaborate with the computer 102 to recognize facial images.

In a further implementation, both the servers 102 and 106 are behind a load balancing device 118, which directs facial recognition tasks/requests between the servers 102 and 106 based on load on them. A load on a facial recognition server is defined as, for example, the number of current facial recognition tasks the server is handling or processing. The load can also be defined as a CPU (Central Processing Unit) load of the server. As still a further example, the load balancing device 118 randomly selects a server for handling a facial recognition request.

Figure 2:
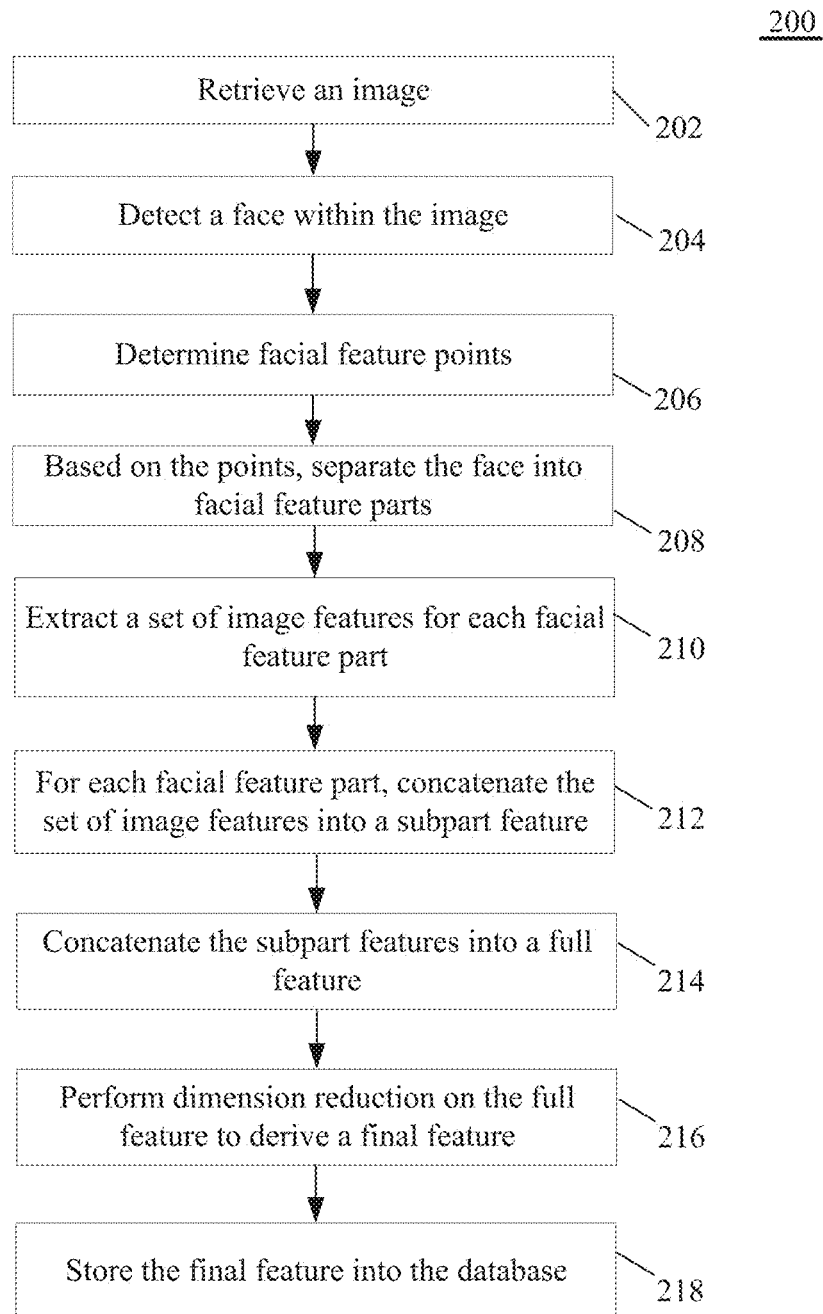
FIG. 2 is a flowchart depicting a process by which a final facial feature is derived in accordance with the teachings of this disclosure.

FIG. 2 depicts a process 200 by which the facial recognition computer 102 derives a final facial feature. At 202, a software application running on the computer 102 retrieves the image from, for example, the database 104, the client computer 122 or the weber server 112 or 114. The retrieved image is an input image for the process 200. At 204, the software application detects a human face within the image. The software application can utilize a number of techniques to detect the face within the input image, such as knowledge-based top-down methods, bottom-up methods based on invariant features of faces, template matching methods, and appearance-based methods as described in "Detecting Faces in Images: A Survey," Ming-Hsuan Yang, et al., IEEE Transactions on Pattern Analysis and machine Intelligence, Vol. 24, No. 1, January 2002, which is hereby incorporated by reference to materials filed herewith.

Figure 12:
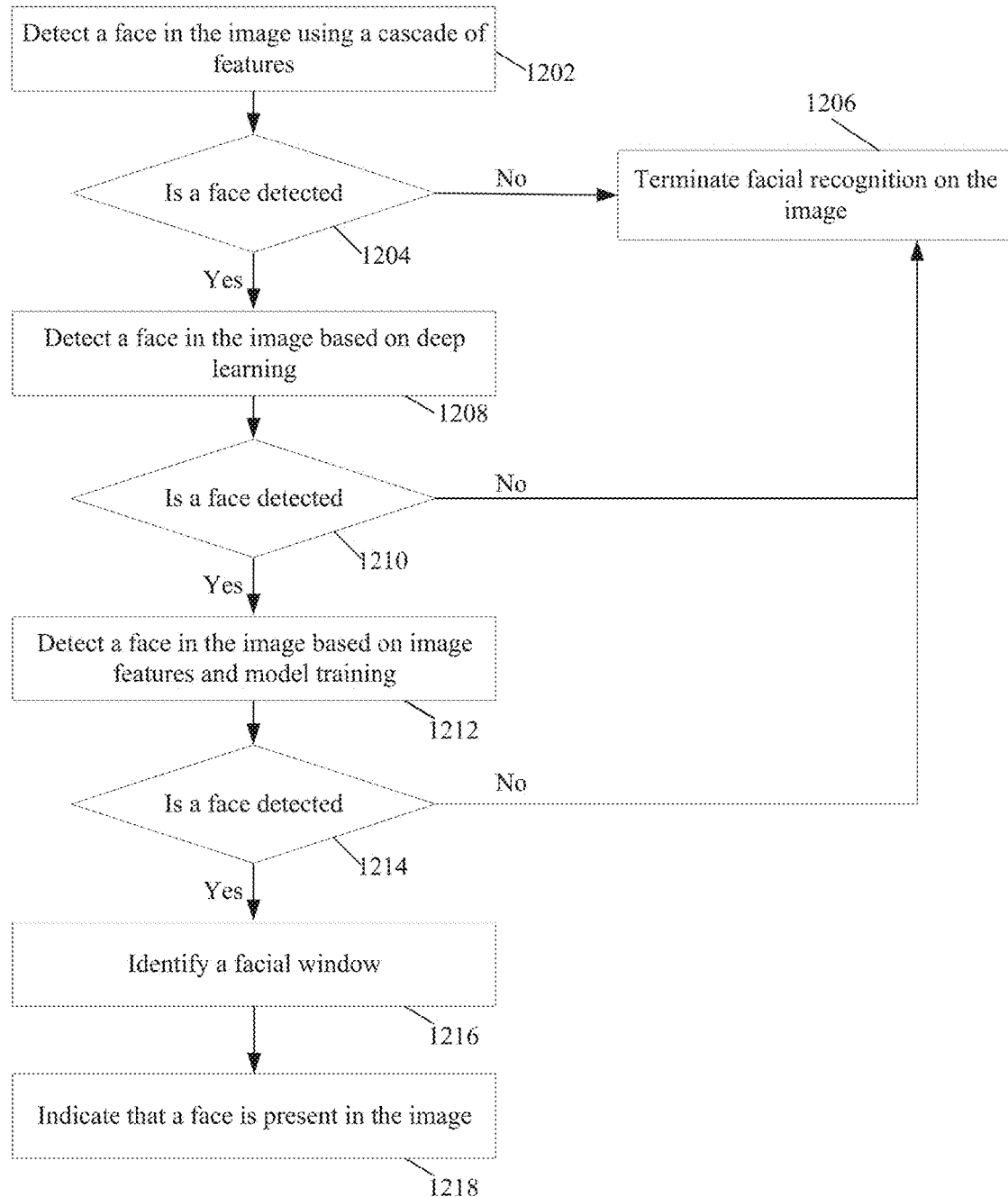
FIG. 12 is a flowchart depicting a process by which a facial recognition computer detects a face within an image in accordance with the teachings of this disclosure.

In one implementation, the software application detects a face within the image (retrieved at 202) using a multi-phase approach, which is shown in FIG. 12 at 1200. Turning now to FIG. 12, at 1202, the software application performs a fast face detection process on the image to determine whether a face is present in the image. In one implementation, the fast face detection process 1200 is based on a cascade of features. One example of the fast face detection method is the cascaded detection process as described in "Rapid Object Detection using a Boosted Cascade of Simple Features," Paul Viola, et al., Computer Vision and Pattern Recognition 2001, IEEE Computer Society Conference, Vol. 1., 2001, which is hereby incorporated by reference to materials filed herewith. The cascaded detection process is a rapid face detection method using a boosted cascade of simple features. However, the fast face detection process gains speed at the cost of accuracy. Accordingly, the illustrative implementation employs a multi-phase detection method.

At 1204, the software application determines whether a face is detected at 1202. If not, at 1206, the software application terminates facial recognition on the image. Otherwise, at 1208, the software application performs a second phase of facial recognition using a deep learning process. A deep learning process or algorithm, such as the deep belief network, is a machine learning method that attempts to learn layered models of inputs. The layers correspond to distinct levels of concepts where higher-level concepts are derived from lower-level concepts. Various deep learning algorithms are further described in "Learning Deep Architectures for AI," Yoshua Bengio, Foundations and Trends in Machine Learning, Vol. 2, No. 1, 2009, which is hereby incorporated by reference to materials filed herewith.

In one implementation, models are first trained from a set of images containing faces before the models are used or applied on the input image to determine whether a face is present in the image. To train the models from the set of images, the software application extracts LBP features from the set of images. In alternate embodiments, different image features or LBP features of different dimensions are extracted from the set of images. A deep learning algorithm with two layers in the convolutional deep belief network is then applied to the extracted LBP features to learn new features. The SVM method is then used to train models on the learned new features.

The trained models are then applied on learned new features from the image to detect a face in the image. For example, the new features of the image are learned using a deep belief network. In one implementation, one or two models are trained. For example, one model (also referred to herein as an "is-a-face" model) can be applied to determine whether a face is present in the image. A face is detected in the image if the is-a-face model is matched. As an additional example, a different model (also referred to herein as an "is-not-a-face" model) is trained and used to determine whether a face is not present in the image.

At 1210, the software application determines whether a face is detected at 1208. If not, at 1206, the software application terminates facial recognition on this image. Otherwise, at 1212, the software application performs a third phase of face detection on the image. Models are first trained from LBP features extracted from a set of training images. After a LBP feature is extracted from the image, the models are applied on the LBP feature of the image to determine whether a face is present in the image. The models and the LBP feature are also referred to herein as third phase models and feature respectively. At 1214, the software application checks whether a face is detected at 1212. If nor, at 1206, the software application terminates facial recognition on this image. Otherwise, at 1216, the software application identifies and marks the portion within the image that contains the detected face. In one implementation, the facial portion (also referred to herein as a facial window) is a rectangular area. In a further implementation, the facial window has a fixed size, such as 100×100 pixels, for different faces of different people. In a further implementation, at 1216, the software application identifies the center point, such as the middle point of the facial window, of the detected face. At 1218, the software application indicates that a face is detected or present in the image.

Turning back to FIG. 2, after the face is detected within the input image, at 206, the software application determines important facial feature points, such as the middle points of eyes, noses, mouth, cheek, jaw, etc. Moreover, the important facial feature points may include, for example, the middle point of the face. In a further implementation, at 206, the software application determines the dimension, such as size and contour, of the important facial features. For example, at 206, the software application determines the top, bottom, left and right points of the left eye. In one implementation, each of the point is a pair of numbers of pixels relative to one corner, such as the upper left corner, of the input image.

Figure 13:
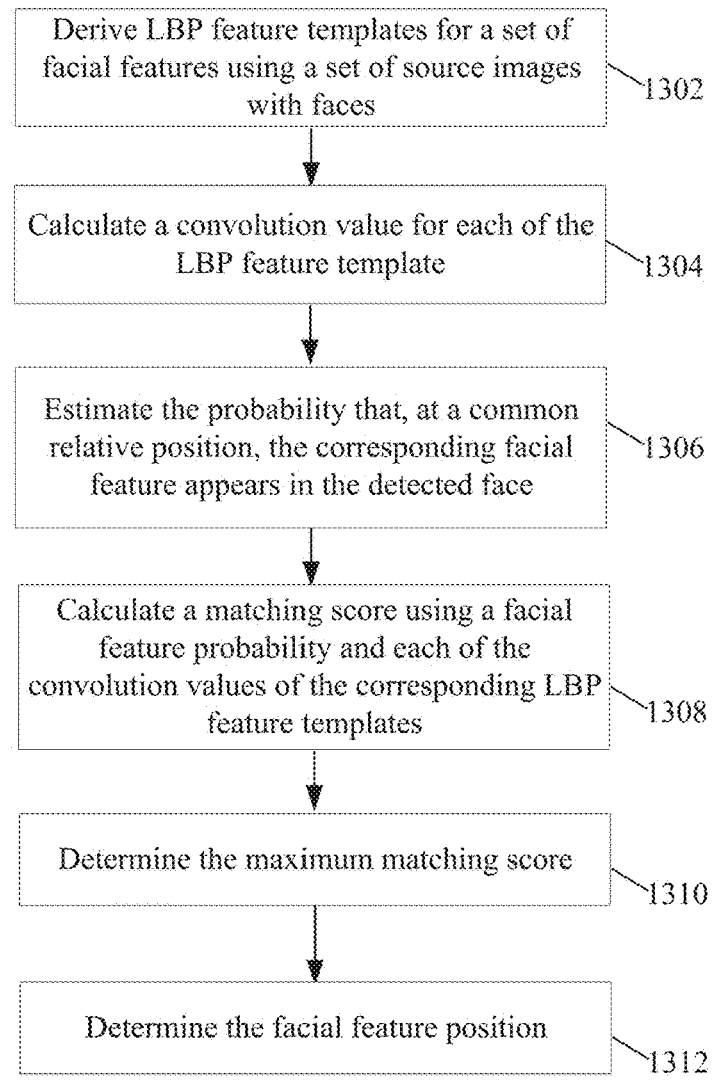
FIG. 13 is a flowchart depicting a process by which a facial recognition computer determines facial feature positions within a facial image in accordance with the teachings of this disclosure.

Facial feature positions (meaning facial feature points and/or dimensions) are determined by a process 1300 as illustrated in FIG. 13. Turning now to FIG. 13, at 1302, the software application derives a set of LBP feature templates for each facial feature in a set of facial features (such as eyes, nose, mouth, etc.) from a set of source images. In one implementation, one or more LBP features are derived from a source image. Each of the one or more LBP features corresponds to a facial feature. For example, one left eye LBP feature is derived from an image area (also referred to herein as LBP feature template image size), such as 100×100, containing the left eye of the face within the source image. Such derived LBP features for facial features are collectively referred to herein as LBP feature templates.

At 1304, the software application calculates a convolution value ("p1") for each of the LBP feature template. The value p1 indicates a probability that the corresponding facial feature, for example, such as the left eye, appears at a position (m, n) within the source image. In one implementation, for a LBP feature template $F_t$, the corresponding value p1 is calculated using an iterative process. Let $m_t$ and $n_t$ denote the LBP feature template image size of the LBP feature template. Additionally, let (u, v) denotes the coordinates or positions of a pixel within the source image. (u, v) is measured from the upper left corner of the source image. For each image area, (u, v)–(u+$m_t$, v+$n_t$), within the source image, a LBP feature, $F_s$, is derived. The inner product, p(u, v), of $F_t$ and $F_s$ is then calculated. p(u, v) is regarded as the probability that the corresponding facial feature (such as the left eye) appears at the position (u, v) within the source image. The values of p(u, v) can be normalized. (m, n) is then determined as argmax(p(u, v)). argmax stands for the argument of the maximum.

Usually, the relative position of a facial feature, such as mouth or nose, to a facial center point (or a different facial point) is the same for most faces. Accordingly, each facial feature has a corresponding common relative position. At 1306, the software application estimates and determines the facial feature probability ("p2") that, at a common relative position, the corresponding facial feature appears or is present in the detected face. Generally, the position (m, n) of a certain facial feature in images with faces follows a probability distribution p2(m, n). Where the probability distribution p2(m, n) is a two dimensional Gaussian distribution, the most likely position at which a facial feature is present is where the peak of the Gaussian distribution is located. The mean and variance of such a two dimensional Gaussian distribution can be established based on empirical facial feature positions in a known set of facial images.

At 1308, for each facial feature in the detected face, the software application calculates a matching score for each position (m, n) using the facial feature probability and each of the convolution values of the corresponding LBP feature templates. For example, the matching score is the product of p1(m, n) and p2(m, n), i.e., p1×p2. At 1310, for each facial feature in the detected face, the software application determines the maximum facial feature matching score. At 1312, for each facial feature in the detected face, the software application determines the facial feature position by selecting the facial feature position corresponding to the LBP feature template that corresponds to the maximum matching score. In the case of the above example, argmax(p1(m, n)*p2(m, n)) is taken as the position of the corresponding facial feature.

Turning back to FIG. 2, based on the determined points and/or dimension of the important facial features, at 208, the software application separates the face into numeral facial feature parts, such as left eye, right eye, and nose. In one implementation, each facial part is a rectangular or square area of a fixed size, such as 17×17 pixels. For each of the facial feature parts, at 210, the software application extracts a set of image features, such as LBP or HOG features. Another image feature that can be extracted, at 210, is an extended LBP to pyramid transform domain ("PLBP"). By cascading the LBP information of hierarchical spatial pyramids, PLBP descriptors take texture resolution variations into account. PLBP descriptors are effective for texture representation.

Oftentimes, a single type of image feature is not sufficient to obtain relevant information from an image or recognize the face in the input image. Instead two or more different image features are extracted from the image. The two or more different image features are generally organized as one single Image feature vector. In one implementation, a large number (such as a ten or more) of image features are extracted from facial feature parts. For instance, LBP features based on 1×1 pixel cells and/or 4×4 pixel cells are extracted from a facial feature part.

For each facial feature part, at 212, the software application concatenates the set of image features into a subpart feature. For example, the set of image features is concatenated into an M×1 or 1×M vector, where M is the number of image features in the set. At 214, the software application concatenates the M×1 or 1×M vectors of all the facial feature parts into a full feature for the face. For example, where there are N (a positive integer, such as six) facial feature parts, the full feature is a (N*M)×1 vector or a 1×(N*M) vector. As used herein, N*M stands for the multiplication product of the integers N and M. At 216, the software application performs dimension reduction on the full feature to derive a final feature for the face within the input image. The final feature is a subset of image features of the full feature. In one implementation, at 216, the software application applies the PCA algorithm on the full feature to select a subset of image features and derive an image feature weight for each image feature in the subset of image features. The image feature weights correspond to the subset of image features, and comprise an image feature weight metric.

PCA is a straightforward method by which a set of data that is inherently high-dimensioned can be reduced to H-dimensions, where H is an estimate of the number of dimensions of a hyperplane that contains most of the higher-dimensioned data. Each data element in the data set is expressed by a set of eigenvectors of a covariance matrix. In accordance with the present teachings, the subset of image features are chosen to approximately represent the image features of the full feature. Some of the image features in the subset of image features may be more significant than others in facial recognition. Furthermore, the set of eigenvalues thus indicates an image feature weight metric, i.e., an image feature distance metric. PCA is described in "Machine Learning and Pattern Recognition Principal Component Analysis," David Barber, 2004, which is hereby incorporated by reference to materials filed herewith.

Mathematically, the process by which PCA can be applied to a large set of input images to derive an image feature distance metric can be expressed as follows:

First, the mean (m) and covariance matrix (S) of the input data is computed:

$$m = \frac{1}{P} \times \sum_{\mu=1}^{P} x^\mu$$

$$S = \frac{1}{P-1} \times \sum_{\mu=1}^{P} (x^\mu - m) \times (x^\mu - m)^T$$

The eigenvectors e1, . . . , eM of the covariance matrix (S) which have the largest eigenvalues are located. The matrix E=[e1, . . . , eM] is constructed with the largest eigenvectors comprising its columns.

The lower dimensional representation of each higher order data point $y^\mu$ can be determined by the following equation:

$$y^\mu = E^T \times (x^\mu - m)$$

In a different implementation, the software application applies the LDA on the full feature to select a subset of image features and derive corresponding image feature weights. In a further implementation, at 218, the software application stores the final feature and corresponding image feature weights into the database 104. Additionally, at 218, the software application labels the final feature by associating the final feature with a label identifying the face in the input image. In one implementation, the association is represented by a record in a table with a relational database.

Figure 3:
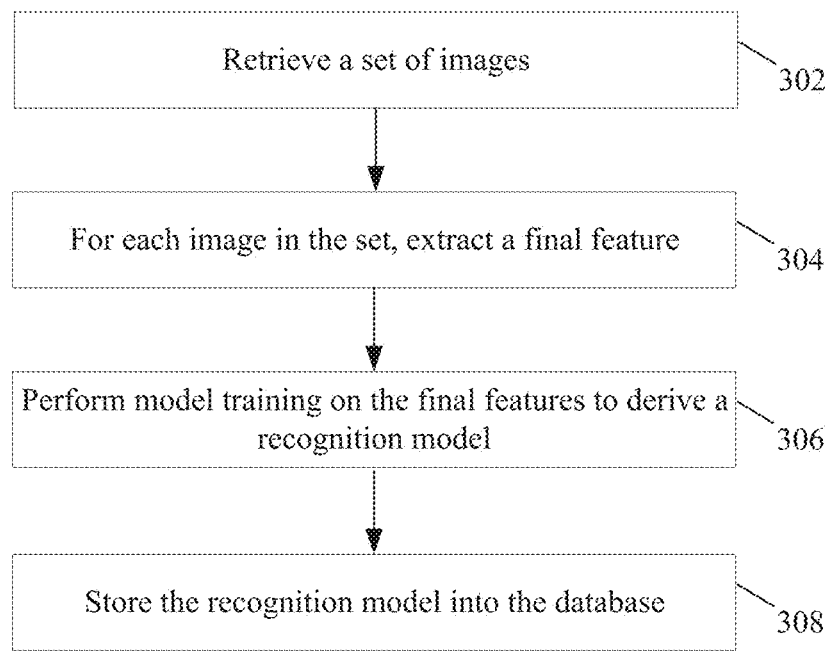
FIG. 3 is a flowchart depicting a process by which a facial recognition model is derived in accordance with the teachings of this disclosure.

Referring to FIG. 3, a model training process 300 performed by a software application running on the server computer 102 is illustrated. At 302, the software application retrieves a set of different images containing the face of a known person, such as the client 120. For example, the client computer 122 uploads the set of images to the server 102 or the cloud computer 154. As an additional example, the client computer 122 uploads a set of URLs, pointing to the set of images hosted on the server 112, to the server 102. The server 102 then retrieves the set of images from the server 112. For each of the retrieved images, at 304, the software application extracts a final feature by performing, for example, elements of the process 200.

At 306, the software application performs one or more model training algorithms (such as SVM) on the set of final features to derive a recognition model for facial recognition. The recognition model more accurately represents the face. At 308, the recognition model is stored in the database 104. Additionally, at 308, the software application stores an association between the recognition model and a label, identifying the face associated with the recognition model, into the database 104. In other words, at 308, the software application labels the recognition model. In one implementation, the association is represented by a record in a table within a relational database.

Example model training algorithms are K-means clustering, Support Vector Machine ("SVM"), Metric Learning, Deep Learning, and others. K-means clustering partitions observations (i.e., models herein) into k (a positive integer) clusters in which each observation belongs to the cluster with the nearest mean. The concept of K-means clustering is further illustrated by the formula below:

$$\min \Sigma_{i=1}^{k} \Sigma_{x_j \in S_i} \|x_j - \mu_i\|^2$$

The set of observations $(x_1, x_2, \ldots, x_n)$ is partitioned into k sets $\{S_1, S_2, \ldots, S_k\}$. The k sets are determined so as to minimize the within-cluster sum of squares. The K-means clustering method is usually performed in an iterative manner between two steps, an assignment step and an update step. Given an initial set of k means $m_1^{(1)}, \ldots, m_k^{(1)}$, the two steps are shown below:

$$S_i^{(t)} = \{x_p : \|x_p - m_i^{(t)}\| \le \|x_p - m_j^{(t)}\| \forall 1 \le j \le k\}$$

During this step, each $x_p$ is assigned to exactly one $S^{(t)}$. The next step calculates new means to be the centroids of the observations in the new clusters.

$$m_i^{(t+1)} = \frac{1}{|S_i^{(t)}|} \sum_{x_j \in S_i^{(t)}} x_j$$

In one implementation, K-means clustering is used to group faces and remove mistaken faces. For example, when the client 120 uploads fifty (50) images with his face, he might mistakenly upload, for example, three (3) images with a face of someone else. In order to train a recognition model for the client's 120 face, it is desirable to remove the three mistaken images from the fifty images when the recognition model is trained from the uploaded images. As an additional, example, when the client 120 uploads large number of facial images of different people, the K-means clustering is used to group the large of number of images bases on the faces contained in these images.

SVM method is used to train or derive a SVM classifier. The trained SVM classifier is identified by a SVM decision function, a trained threshold and other trained parameters. The SVM classifier is associated with and corresponds to one of the models. The SVM classifier and the corresponding mod& are stored in the database 104.

Machine learning algorithms, such as KNN, usually depend on a distance metric to measure how close two image features are to each other. In other words, an image feature distance, such as Euclidean distance, measures how close one facial image matches to another predetermined facial image. A learned metric, which is derived from a distance metric learning process, can significantly improve the performance and accuracy in facial recognition. One such learned distance metric is a Mahalanobis distance which gauges similarity of an unknown image to a known image. For example, a Mahalanobis distance can be used to measure how close an input facial image is matched to a known person's facial image. Given a vector of mean value $\mu = (\mu_1, \mu_2, \ldots, \mu_N)^T$ of a group of values, and a covariance metric S, the Mahalanobis distance is shown by the formula below:

$$D_M(x) = \sqrt{(x-\mu)^T S^{-1} (x-\mu)}$$

Figure 14:
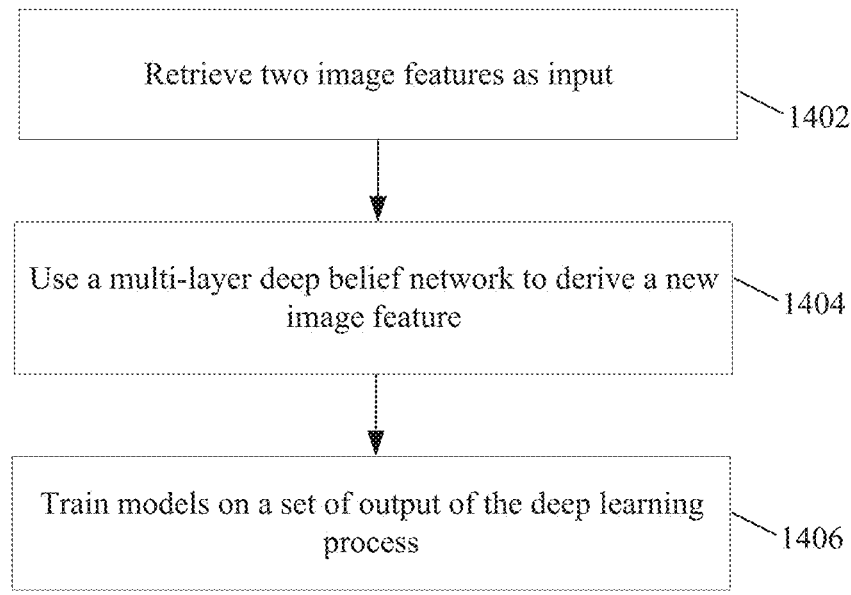
FIG. 14 is a flowchart depicting a process by which a facial recognition computer determines a similarity of two image features in accordance with the teachings of this disclosure.

Various Mahalanobis distance and distance metric learning methods are further described in "Distance Metric Learning: A Comprehensive Survey," Liu Yang, May 19, 2006, which is hereby incorporated by reference to materials filed herewith. In one implementation, Mahalanobis distance is learned or derived using a deep learning process 1400 as shown in FIG. 14. Turning to FIG. 14, at 1402, a software application performed by a computer, such as the server 102, retrieves or receives two image features, X and Y, as input. For example, X and Y are final features of two different images with a same known face. At 1404, the software application, based on a multi-layer deep belief network, derives a new Image feature from the input features X and Y. In one implementation, at 1404, the first layer of the deep belief network uses the difference, X–Y, between the features X and Y.

At the second layer, the product, XY, of the features X and Y are used. At the third layer, a convolution of the features X and Y are used. Weights for the layers and neurons of the multi-layer deep belief network are trained from training facial images. As end of the deep learning process, a kernel function is derived. In other words, a kernel function, K(X, Y), is the output of the deep learning process. The above Mahalanobis distance formula is one form of the kernel function.

At 1406, a model training algorithm, such as SVM method, is used to train models on the output, K(X, Y), of the deep leaning process. The trained models are then applied to a specific output of the deep learning processing, K(X1, Y1), of two input image features X1 and Y1 to determine whether the two input image features are derived from the same face, i.e., whether they indicate and represent the same face.

Model training process is performed on a set of images to derive a final or recognition model for a certain face. Once the model is available, it is used to recognize a face within an image. The recognition process is further illustrated by reference to FIG. 4, where a facial recognition process 400 is shown. At 402, a software application running on the server 102 retrieves an image for facial recognition. The image can be received from the client computer 122 or retrieved from the servers 112 and 114. Alternatively, the image is retrieved from the database 104. In a further implementation, at 402, a batch of images is retrieved for facial recognition. At 404, the software application retrieves a set of models from the database 104. The models are generated from, for example, the model training process 300. At 406, the software application performs, or calling another process or software application to perform, the process 200 to extract a final feature from the retrieved image. Where the retrieved image does not contain a face, the process 400 ends at 406.

At 408, the software application applies each of models on the final feature to generate a set of comparison scores. In other words, the models operate on the final feature to generate or calculate the comparison scores. At 410, the software application selects the highest score from the set of comparison scores. The face corresponding to the model that outputs the highest score is then recognized as the face in the input image. In other words, the face in the input image retrieved at 402 is recognized as that identified by the model corresponding to or associated with the highest score. Each model is associated or labeled with a face of a natural person. When the face in the input image is recognized, the input image is then labeled and associated with the label identifying the recognized face. Accordingly, labeling a face or image containing the face associates the image with the label associated with the model with the highest score. The association and personal information of the person with the recognized face are stored in the database 104.

At 412, the software application labels the face and the retrieved image with the label associated with the model with highest score. In one implementation, each label and association is a record in a table within a relational database. Turning back to 410, the selected highest score can be a very low score. For example, where the face is different from the faces associated with the retrieved models, the highest score is likely to be a lower score. In such a case, in a further implementation, the highest score is compared to a predetermined ed threshold. If the highest score is below the threshold, at 414, the software application indicates that the face in the retrieved image is not recognized.

In a further implementation, at 416, the software application checks whether the retrieved image for facial recognition is correctly recognized and labeled. For example, the software application retrieves a user confirmation from the client 120 on whether the face is correctly recognized. If so, at 418, the software application stores the final feature and the label (meaning the association between the face and image and the underlying person) into the database 104. Otherwise, at 420, the software application retrieves from, for example, the client 120 a new label associating the face with the underlying person. At 418, the software application stores final feature, recognition models and the new label into the database 104.

Figure 10:
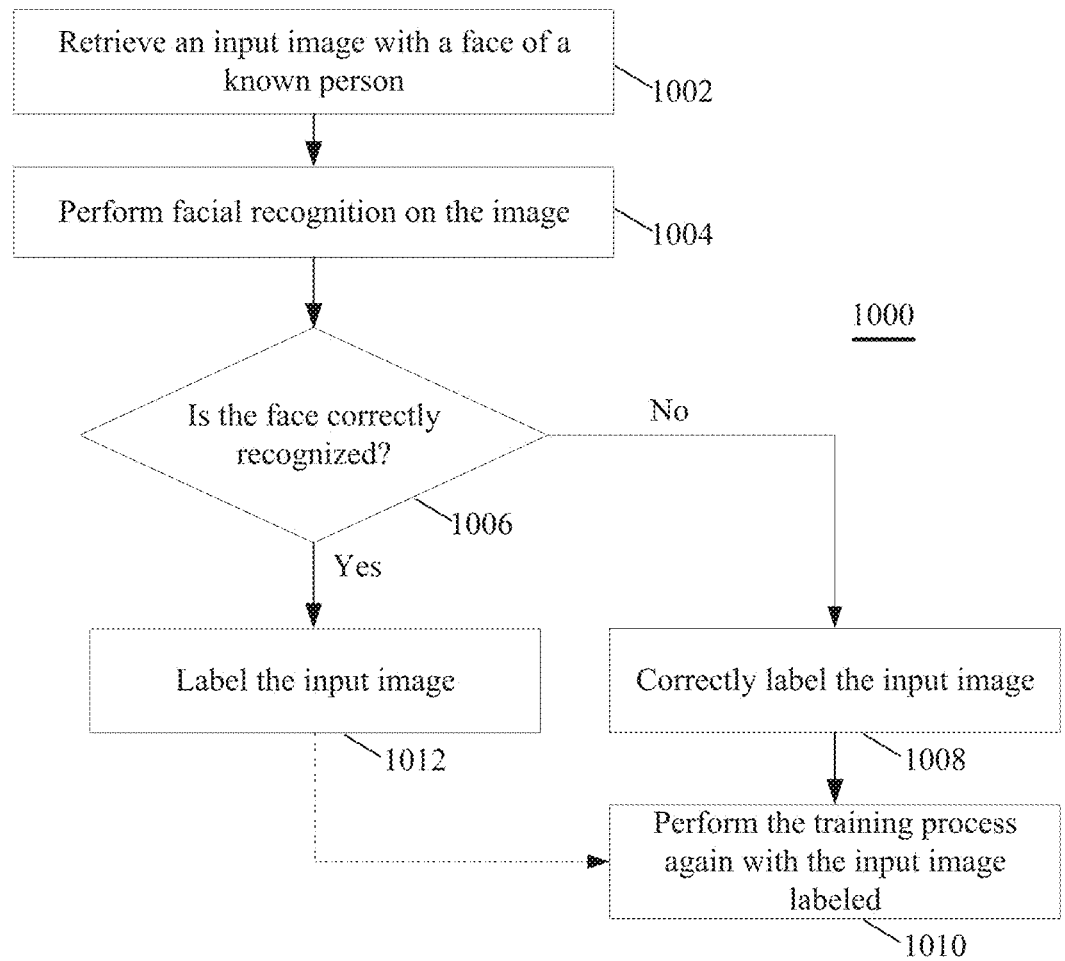
FIG. 10 is a flowchart depicting an iterative process by which a facial recognition computer refines facial recognition in accordance with the teachings of this disclosure.

The stored final features and labels are then used by the model training process 300 to improve and update models. An illustrative refinement and correction process 1000 is shown by reference to FIG. 10. At 1002, the software application retrieves an input image with a face of a known person, such as the client 120. At 1004, the software application performs facial recognition, such as the process 400, on the input image. At 1006, the software application determines, such as by seeking a confirmation from the client 120, whether the face is correctly recognized. If not, at 1008, the software application labels and associates the input image with the client 120. At 1010, the software application performs the model training process 300 on the input image, and stores the derived recognition model and the label into the database 104. In a further implementation, the software application performs the training process 300 on the input image along with other known images with the face of the client 120. Where the face is correctly recognized, the software application may also, at 1012, label the input image, and optionally performs the training process 300 to enhance the recognition model for the client 120.

Turning back to FIG. 4, the facial recognition process 400 is based on image feature models, trained and generated from the process 300. The model training process 300 generally demands a great amount of computation resources, such as CPU cycles and memory. The process 300 is thus a relatively time consuming and resource expensive process. In certain cases, such as real-time facial recognition, it is desirable for a faster facial recognition process. In one implementation, the final features and/or the fill features, extracted at 214 and 216 respectively, are stored in the database 104. A process 500, using the final features or full features to recognize faces within images, is shown by reference to FIG. 5. In one implementation, the process 500 is performed by a software application running on the server 102, and utilizes the well-known KNN algorithm.

At 502, the software application retrieves an image with a face for facial recognition from, for example, the database 104, the client computer 122 or the server 112. In a further implementation, at 502, the software application retrieves a batch of images for facial recognition. At 504, the software application retrieves, from the database 104, final features. Alternatively, full features are retrieved and used for facial recognition. Each of the final features corresponds to or identifies a known face or person. In other words, each of the final features is labeled. In one embodiment, only final features are used for facial recognition. Alternatively, only full features are used. At 506, the software application sets a value for the integer K of the KNN algorithm. In one implementation, the value of K is one (1). In such a case, the nearest neighbor is selected. In other words, the closest match of the known faces in the database 104 is selected as the recognized face in the image retrieved at 502. At 508, the software application extracts a final feature from the image. Where the full features are used for facial recognition, at 510, the software application derives a full feature from the image.

At 512, the software application performs the KNN algorithm to select K nearest matching faces to the face in the retrieved image. For example, the nearest matches are selected based on the image feature distances between the final feature of the retrieved image and the final features retrieved at 504. In one implementation, the image feature distances are ranked from the smallest to the largest; and the K faces corresponding to the first K smallest image feature distances. For example, $$\frac{1}{\text{image feature distance}}$$

can be designated as the ranking score. Accordingly, a higher score indicates a closer match. The image feature distances can be Euclidean distances or Mahalanobis distances. At 514, the software application labels and associates the face within the image with the nearest matching face. At 516, the software application stores the match, indicated by the label and association, into the database 104.

Figure 6:
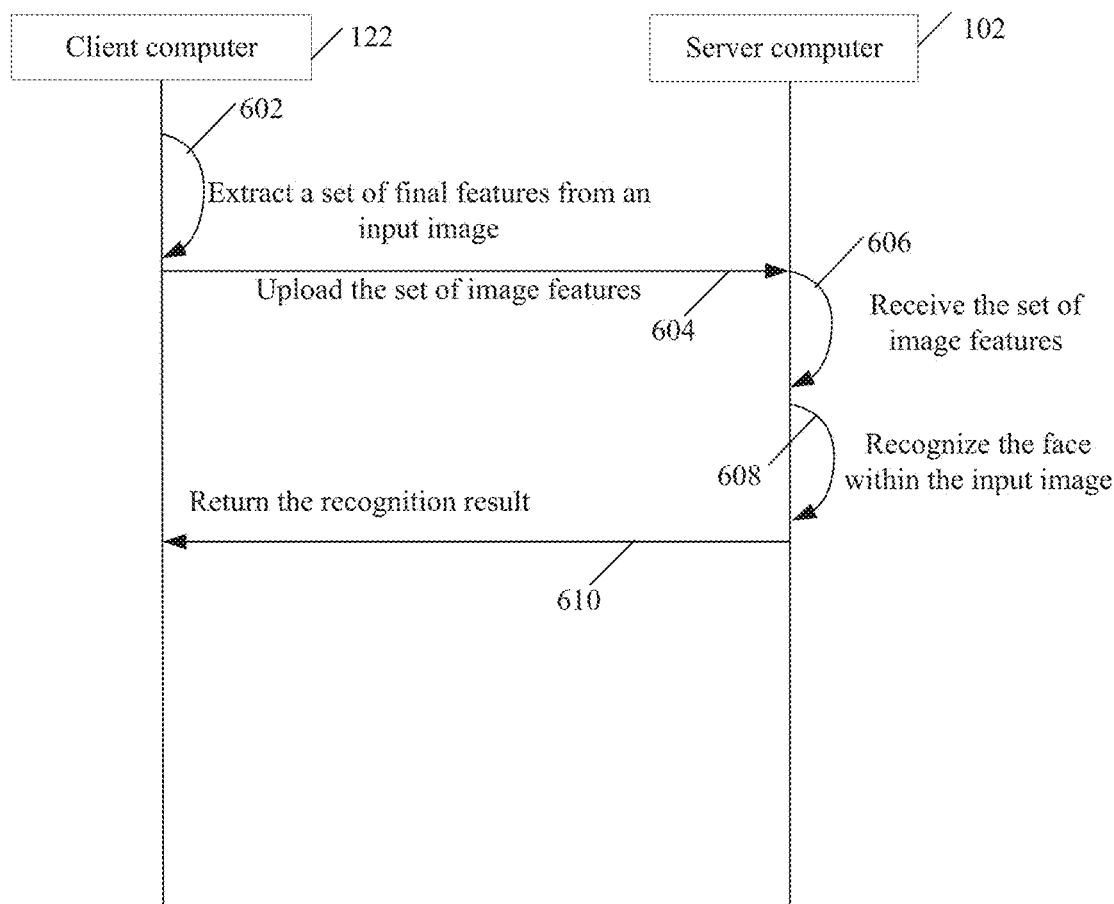
FIG. 6 is a sequence diagram depicting a process by which a facial recognition server computer and a client computer collaboratively recognize a face within an image in accordance with the teachings of this disclosure.
Figure 7:
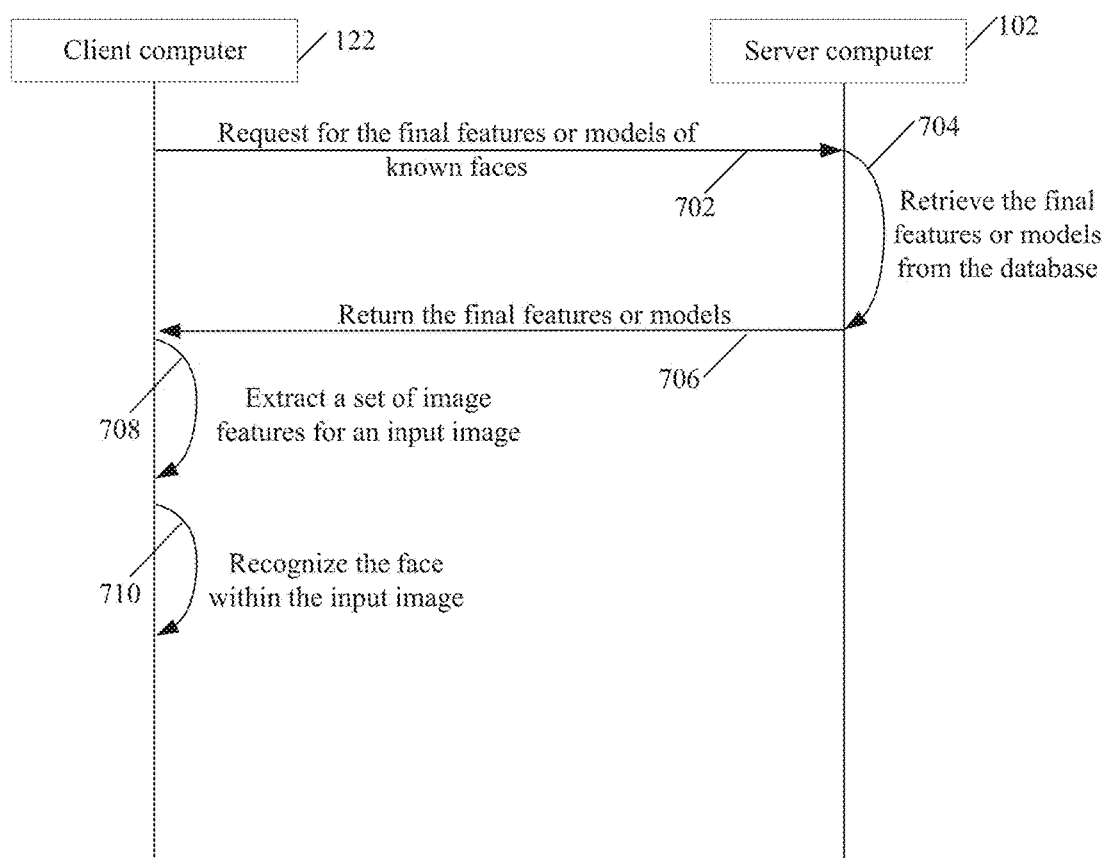
FIG. 7 is a sequence diagram depicting a process by which a facial recognition server computer and a client computer collaboratively recognize a face within an image in accordance with the teachings of this disclosure.

In an alternate embodiment of the present teachings, the facial processes 400 and 500 are performed in a client-server or cloud computing framework. Referring now to FIGS. 6 and 7, two client-server based facial recognition processes are shown at 600 and 700 respectively. At 602, a client software application running on the client computer 122 extracts a set of full features from an input image for facial recognition. The input image is loaded into memory from a storage device of the client computer 122. In a further implementation, at 602, the client software application extracts a set of final features from the set of full features. At 604, the client software application uploads the image features to the server 102. A server software application running on the computer 102, at 606, receives the set of image features from the client computer 122.

At 608, the server software application performs elements of the processes 400 and/or 500 to recognize the face within the input image. For example, at 608, the server software application performs the elements 504,506,512,514,516 of the process 500 to recognize the face. At 512, the server software application sends the recognition result to the client computer 122. For example, the result can indicate that there is no human face in the input image, the face within the image is not recognized, or the face is recognized as that of a specific person.

In a different implementation as illustrated by reference to a method 700 as shown in FIG. 7, the client computer 122 performs most of the processing to recognize a face within one or more input images. At 702, a client software application running on the client computer 122 sends a request for the final features or models of known faces to the server computer 102. Alternatively, the client software application requests for more than one category of data. For example, the client software application requests for the final features and models of known faces. Moreover, the client software application can request such data for only certain people.

At 704, the server software application receives the request, and retrieves the requested data from the database 104. At 706, the server software application sends the requested data to the client computer 122. At 708, the client software application extracts, for example, a final feature from an input image for facial recognition. The input image is loaded into memory from a storage device of the client computer 122. At 710, the client software application performs elements of the processes 400 and/or 500 to recognize the face within the input image. For example, at 710, the client software application performs the elements 504,506, 512,514,516 of the process 500 to recognize the face in the input image.

Figure 8:
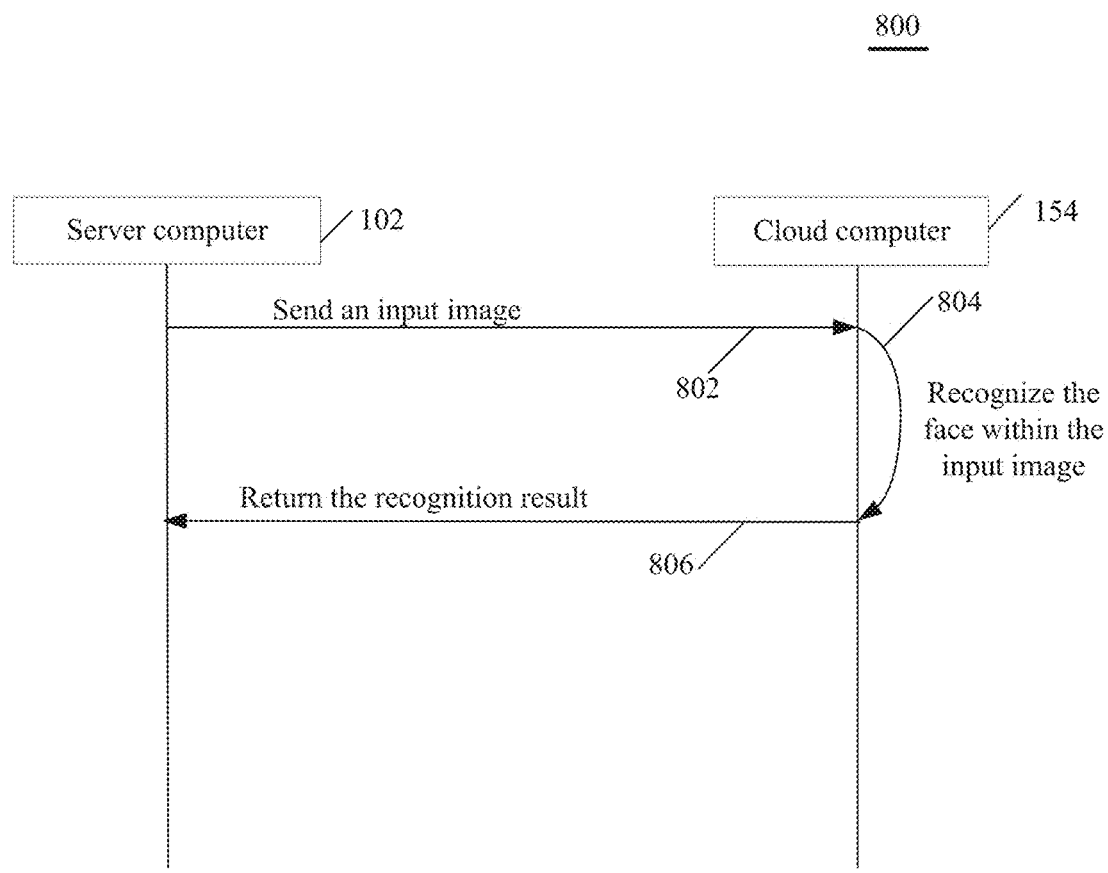
FIG. 8 is a sequence diagram depicting a process by which a facial recognition cloud computer and a cloud computer collaboratively recognize a face with an image in accordance with the teachings of this disclosure.

The facial recognition process 400 or 500 can also be performed in a cloud computing environment 152. One such illustrative implementation is shown in FIG. 8. At 802, a server software application running on the facial recognition server computer 102 sends an input image or a URL to the input image to a cloud software application running on a cloud computer 154, 156 or 158. At 804, the cloud software application performs some or all elements of the process 400 or 500 to recognize the face within the input image. At 806, the cloud software application returns the recognition result to the server software application. For example, the result can indicate that there is no human face in the input image, the face within the image is not recognized, or the face is recognized as that of a specific person.

Alternatively, the client computer 122 communicates and collaborates with the cloud computer 154, such as the cloud computer 154, to perform the elements 702,704,706,708,710 for recognizing a face within an image or video clip. In a further implementation, a load balancing mechanism is deployed and used to distribute facial recognition requests between server computers and cloud computers. For example, a utility tool monitors processing burden on each server computer and cloud computer, and selects a server computer or cloud computer has a lower processing burden to serve a new facial recognition request or task. In a further implementation, the model training process 300 is also performed in a client-server or cloud architecture.

Figure 9:
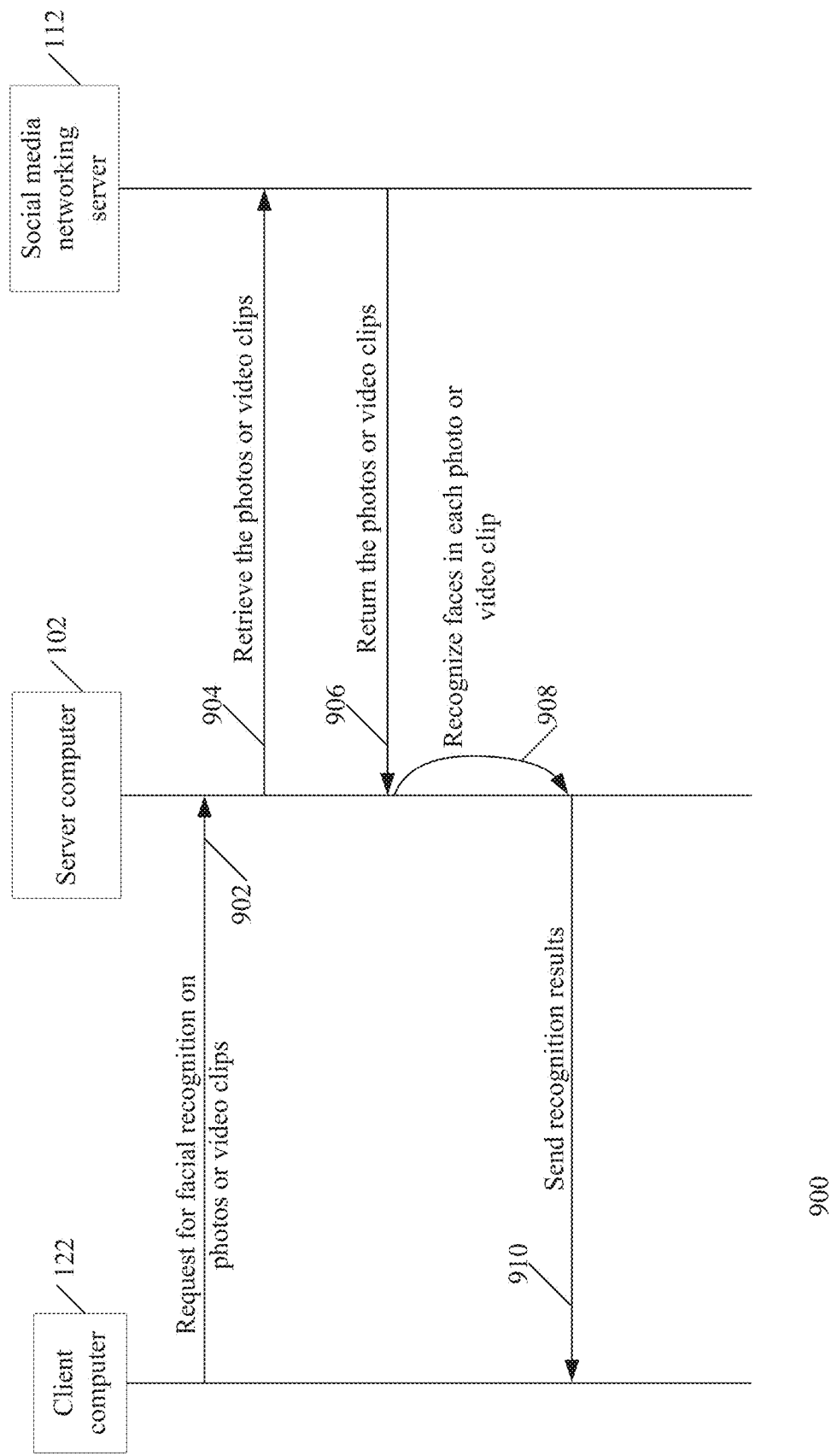
FIG. 9 is a sequence diagram depicting a process by which a facial recognition server computer recognizes a face within photos posted on a social media networking web page in accordance with the teachings of this disclosure.

Referring now to FIG. 9, a sequence diagram illustrating a process 900 by which the facial recognition computer 102 recognizes faces in photo images or video clips hosted and provided by a social media networking server or file storage server, such as the server 112 or 114. At 902, a client software application running on the client computer 122 issues a request for facial recognition on his photos or video clips hosted on a social media website, such as Facebook, or file storage hosting site, such as Dropbox. In one implementation, the client software application further provides his account access information (such as login credentials) to the social media website or file storage hosting site. At 904, a server software application running on the server computer 102 retrieves photos or video clips from the server 112. For example, the server software application crawls web pages associated with the client 122 on the server 112 to retrieve photos. As a further example, the server software application requests for the photos or video clips via HTTP (Hypertext Transfer Protocol) requests.

At 906, the server 112 returns the photos or video clips to the server 102. At 908, the server software application performs facial recognition, such as by performing the process 300, 400 or 500, on the retrieved photos or video clips. For example, when the process 300 is performed, a model or image features describing the face of the client 120 are derived and stored in the database 104. At 910, the server software application returns the recognition result or notification to the client software application.

Figure 11A:
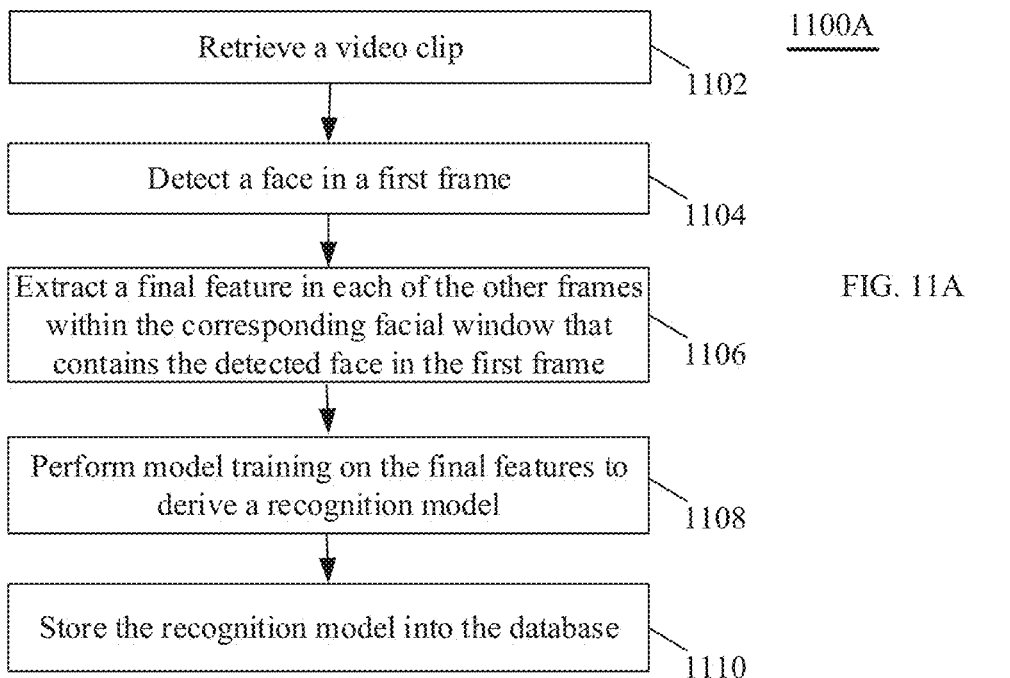
FIG. 11A is a flowchart depicting a process by which a facial recognition computer derives a facial recognition mod& from a video clip in accordance with the teachings of this disclosure.

Referring now to FIG. 11A, a process 1100A by which a facial recognition model is derived from in a video clip is shown. At 1102, a software application running on the server 102 retrieves a video clip, containing a stream or sequence of still video frames or images, for facial recognition. At 1102, the application further selects a set of representing frames or all frames from the video clip to derive a model. At 1104, the software application performs a process, such as the process 200, to detect a face and derive a final feature of the face from a first frame, for example, such as the first or second frame of the selected set of frames. Additionally, at 1104, the server application identifies the facial area or window within the first frame that contains the detected face. For example, the facial window is in a rectangular or square shape.

At 1106, for each of the other frames in the set of selected frame, the server application extracts or derives a final feature from an image area corresponding to the facial window identified at 1104. For example, where the facial window identified at 1104 is indicated by pixel coordinate pairs (101, 242) and (300, 435), at 1106, each of the corresponding facial windows in other frames is defined by the pixel coordinate pairs (101, 242) and (300, 435). In a further implementation, the facial window is larger or smaller than the facial window identified at 1104. For example, where the facial window identified at 1104 is indicated by pixel coordinate pairs (101, 242) and (300, 435), each of the corresponding facial windows in other frames is defined by the pixel coordinate pairs (91, 232) and (310, 445). The latter two pixel coordinate pairs define a larger image area than the face area of 1104. At 1108, the server application performs model training on the final features to derive a recognition model of the identified face. At 1110, the server application stores mod& and a label indicating the person with the recognized face into the database 104.

Figure 11B:
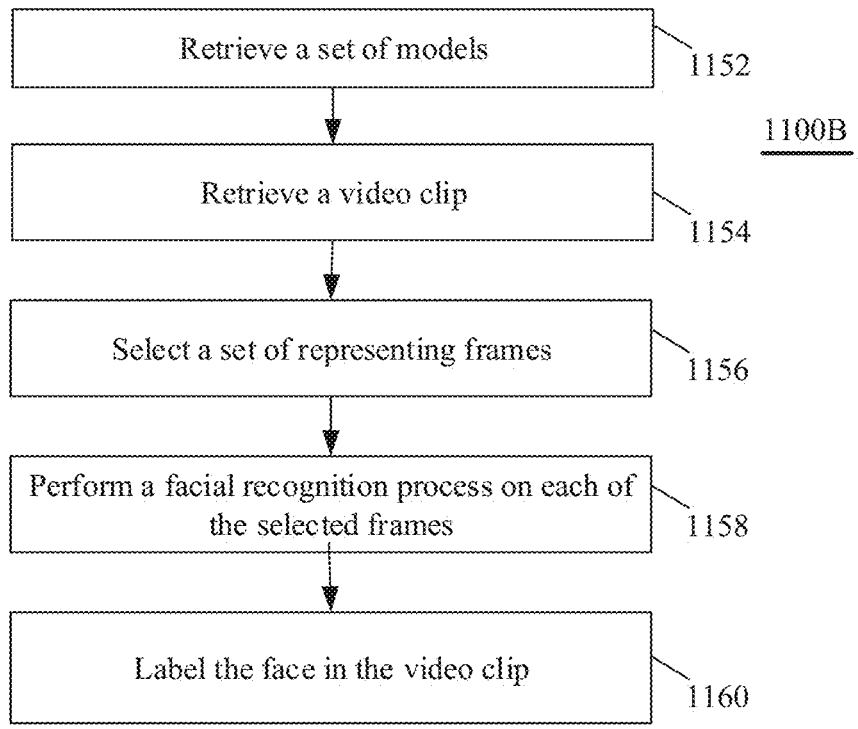
FIG. 11B is a flowchart depicting a process by which a facial recognition computer recognizes a face in a video clip in accordance with the teachings of this disclosure.

A process 1100B by which a face is recognized in a video clip is illustrated by reference to FIG. 11B. At 1152, a software application running on the server 102 retrieves a set of facial recognition models from, for example, the database 104. In one implementation, the application also retrieves labels associated with the retrieved models. At 1154, the application retrieves a video clip, containing a stream or sequence of still video frames or images, for facial recognition. At 1156, the application selects a set of representing frames from the video clip. At 1158, using the retrieved models, the application performs a facial recognition process on each of the selected frames to recognize a face. Each of the recognized face corresponds to a model. Moreover, at 1158, for each of the recognized faces, the application associates the face with the associated label of the model that corresponds to the recognized face. At 1160, the application labels the face in the video clip with the label having the highest frequency between the labels associated with the selected frames.

Figure 16:
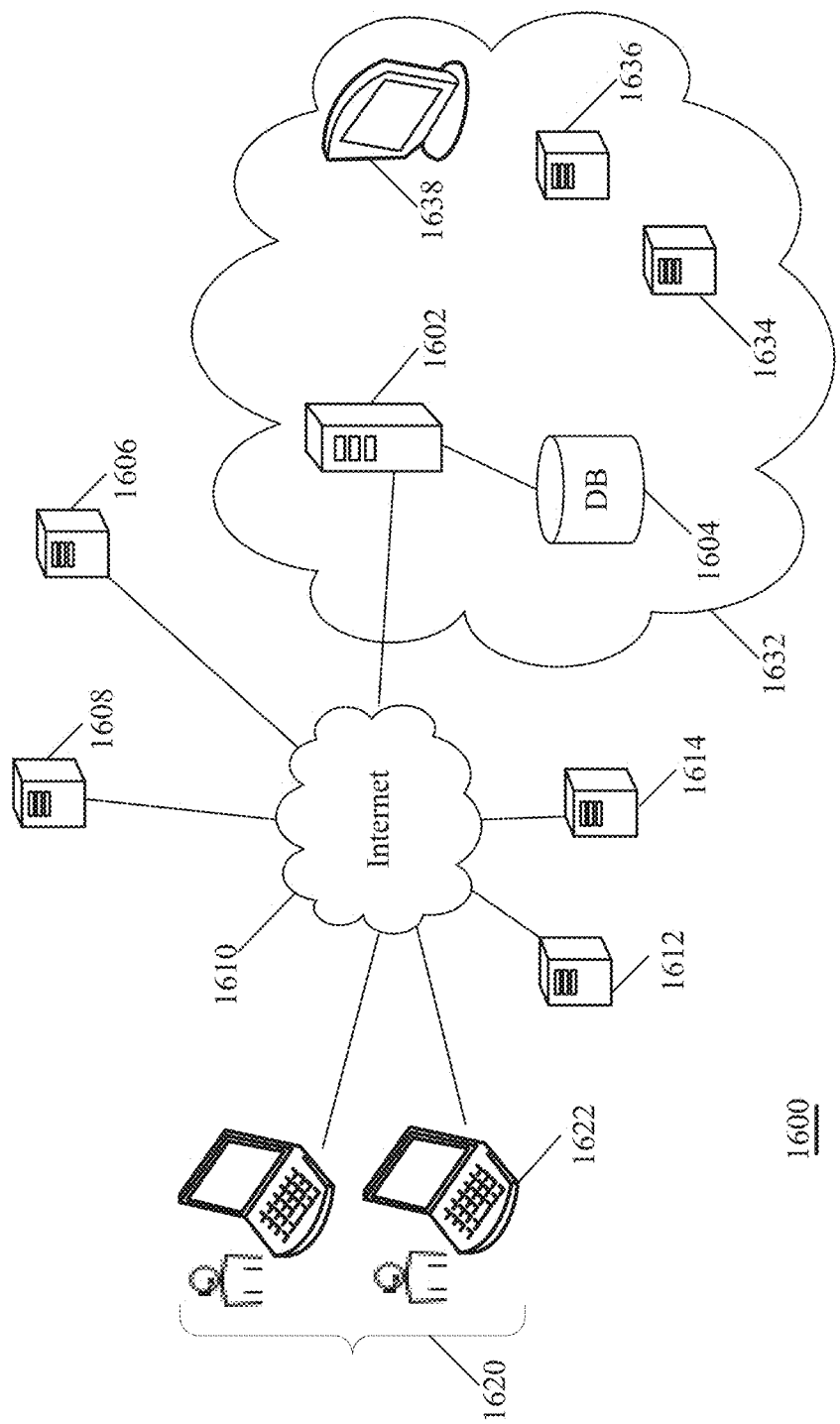
FIG. 16 is a simplified block diagram of an image processing system constructed in accordance with this disclosure.

Turning to FIG. 16, an image processing system 1600 for understanding a scene image is shown. In one implementation, the system 1600 is capable of performing the functions of the system 100, and vice versa. The system 1600 includes an image processing computer 1602 coupled to a database 1604 which stores images (or references to image files) and image features. In one implementation, the database 1604 stores, for example, a large number of images and image features derived from the images. Furthermore, the images are categorized by scene types, such as a beach resort or a river. The computer 1602 is further coupled to a wide area network, such as the Internet 1610. Over the Internet 1610, the computer 1602 receives scene images from various computers, such as client (consumer or user) computers 1622 (which can be one of the devices pictured in FIG. 15) used by clients 1620. Alternatively, the computer 1602 retrieves scene images through a direct link, such as a high speed USB link. The computer 1602 analyzes and understands the received scene images to determine scene types of the images.

Furthermore, the image processing computer 1602 may receive images from web servers 1606 and 1608. For example, the computer 1622 sends a URL to a scene image (such as an advertisement picture for a product hosted on the web server 1606) to the computer 1602. Responsively, the computer 1602 retrieves the image pointed to by the URL, from the web server 1606. As an additional example, the computer 1602 requests a beach resort scene image from a travel website hosted on the web server 1608. In one embodiment of the present teachings, the client 1620 loads a social networking web page on his computer 1622. The social networking web page includes a set of photos hosted on a social media networking server 1612. When the client 1620 requests recognition of scenes within the set of photos, the computer 1602 retrieves the set of photos from the social media networking server 1612 and performs scene understanding on the photos. As an additional example, when the client 1620 watches a video clip hosted on a web video server 1614 on his computer 1622, she requests the computer 1602 to recognize the scene type in the video clip. Accordingly, the computer 1602 retrieves a set of video frames from the web video server 1614 and performs scene understanding on the video frames.

In one implementation, to understand a scene image, the image processing computer 1602 performs all scene recognition steps. In a different implementation, the scene recognition is performed using a client-server approach. For example, when the computer 1622 requests the computer 1602 to understand a scene image, the computer 1622 generates certain image features from the scene image and uploads the generated image features to the computer 1602. In such a case, the computer 1602 performs scene understanding without receiving the scene image or generating the uploaded image features. Alternatively, the computer 1622 downloads predetermined image features and/or other image feature information from the database 1604 (either directly or indirectly through the computer 1602). Accordingly, to recognize a scene image, the computer 1622 independently performs image recognition. In such a case, the computer 1622 avoids uploading images or image features onto the computer 1602.

In a further implementation, scene image recognition is performed in a cloud computing environment 1632. The cloud 1632 may include a large number and different types of computing devices that are distributed over more than one geographical area, such as Each Coast and West Coast states of the United States. For example, a server 1634, a workstation computer 1636, and a desktop computer 1638 in the cloud 1632 are physically located in different states or countries and collaborate with the computer 1602 to recognize scene images.

Figure 17:
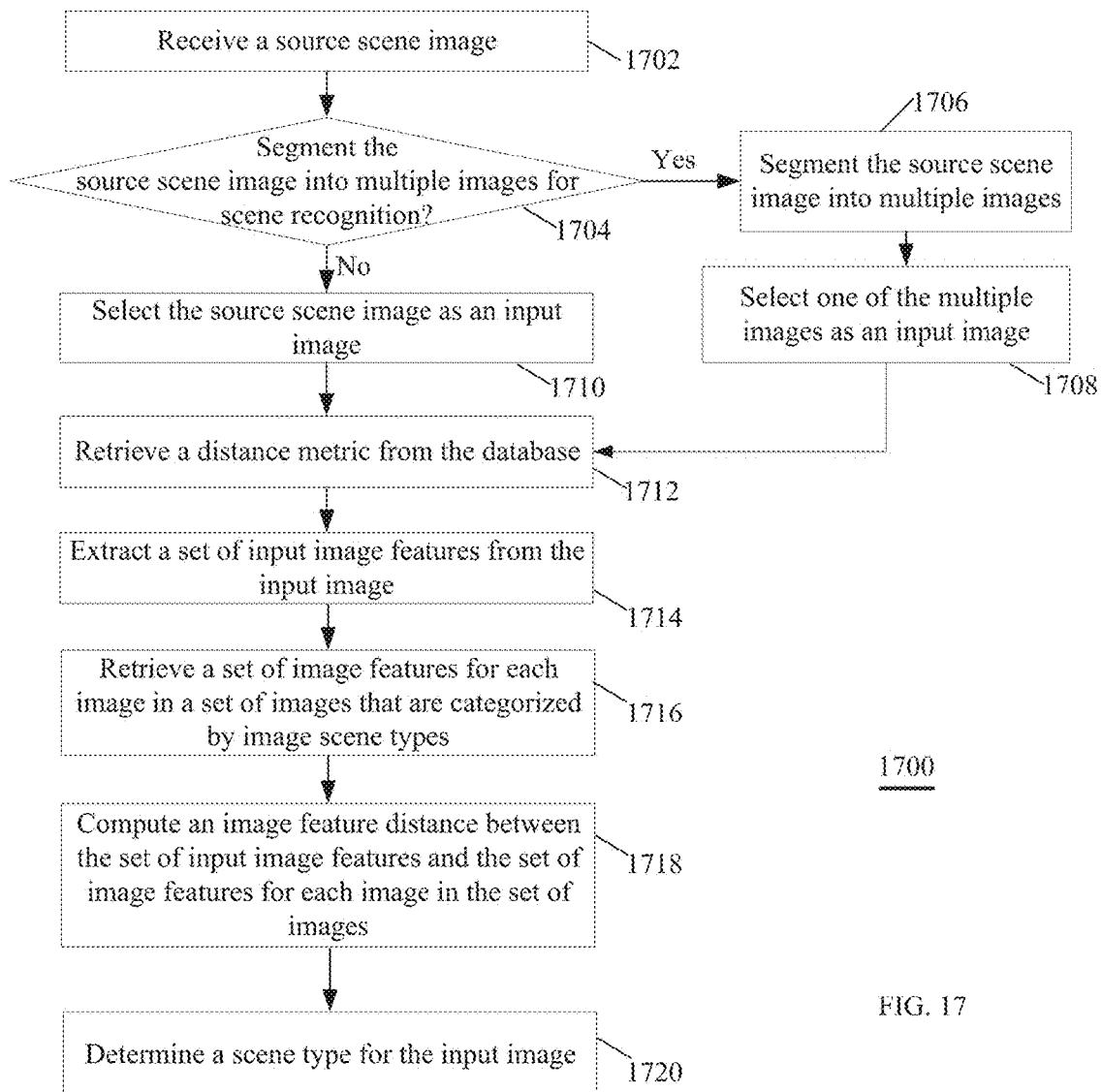
FIG. 17 is a flowchart depicting a process by which an image processing computer recognizes an image in accordance with the teachings of this disclosure.

FIG. 17 depicts a process 1700 by which the image processing computer 1602 analyzes and understands an image. At 1702, a software application running on the computer 1602 receives a source scene image over a network (such as the Internet 1610) from the client computer 1622 for scene recognition. Alternatively, the software application receives the source scene image from a different networked device, such as the web server 1606 or 1608. Oftentimes, a scene image comprises multiple images of different objects. For example, a sunset image may include an image of the glowing Sun in the sky and an image of a landscape. In such a case, it may be desirable to perform scene understanding on the Sun and the landscape separately. Accordingly, at 1704, the software application determines whether to segment the source image into multiple images for scene recognition. If so, at 1706, the software application segments the source scene image into multiple images.

Various image segmentation algorithms (such as Normalized Cut or other algorithms known to persons of ordinal skill in the art) can be utilized to segment the source scene image. One such algorithm is described in "Adaptive Background Mixture Models for Real-Time Tracking," Chris Stauffer, W. E. L Crimson, The Artificial Intelligence Laboratory, Massachusetts Institute of Technology, which is hereby incorporated by reference to materials filed herewith. The Normalized Cut algorithm is also described in "Normalized Cuts and Image Segmentation," Jianbo Shi and Jitendra Malik, IEEE Transactions on Pattern Analysis and Machine Intelligence, Vol. 22, No. 8, August 2000, which is hereby incorporated by reference to materials filed herewith.

For example, where the source scene image is a beach resort picture, the software application may apply a Background Subtraction algorithm to divide the picture into three images—a sky image, a sea image, and a beach image. Various Background Subtraction algorithms are described in "Segmenting Foreground Objects from a Dynamic Textured Background via a Robust Kalman Filter," Jing Zhong and Stan Sclaroff. Proceedings of the Ninth IEEE International Conference on Computer Vision (ICCV 2003) 2-Volume Set 0-7695-1950-4/03: "Saliency, Scale and Image Description," Timor Kadir, Michael Brady, International Journal of Computer Vision 45(2), 83-105, 2001; and "GrabCut—interactive Foreground Extraction using Iterated Graph Cuts," Carsten Rother, Vladimir Kolmogorov, Andrew Blake, ACM Transactions on Graphics (TOG), 2004, which are hereby incorporated by reference to materials filed herewith.

Subsequently, the software application analyzes each of the three images for scene understanding. In a further implementation, each of the image segments is separated into a plurality of image blocks through a spatial parameterization process. For example, the plurality of image blocks includes four (4), sixteen (16), or two hundred fifty six (256) image blocks. Scene understanding methods are then performed on each of the component image block. At 1708, the software application selects one of the multiple images as an input image for scene understanding. Turning back to 1704, if the software application determines to analyze and process the source scene image as a single image, at 1710, the software application selects the source scene image as the input image for scene understanding. At 1712, the software application retrieves a distance metric from the database 1604. In one embodiment, the distance metric indicates a set (or vector) of image features and includes a set of image feature weights corresponding to the set of image features.

In one implementation, a large number (such as a thousand or more) of image features are extracted from images. For instance, LBP features based on 1×1 pixel cells and/or 4×4 pixel cells are extracted from images for scene understanding. As an additional example, an estimation depth of a static image defines a physical distance between the surface of an object in the image and the sensor that captured the image. Triangulation is a wed-known technique to extract an estimation depth feature. Oftentimes, a single type of image feature is not sufficient to obtain relevant information from an image or recognize the image. Instead two or more different image features are extracted from the image. The two or more different image features are generally organized as one single image feature vector. The set of all possible feature vectors constitutes a feature space.

The distance metric is extracted from a set of known images. The set of images are used to find a scene type and/or a matching image for the input image. The set of images can be stored in one or more databases (such as the database 1604). In a different implementation, the set of images is stored and accessible in a cloud computing environment (such as the cloud 1632). Additionally, the set of images can include a large number of images, such as, for example, two million images. Furthermore, the set of images is categorized by scene types. In one example implementation, a set of two millions of images are separated into tens of categories or types, such as, for example, beach, desert, flower, food, forest, indoor, mountain, night_life, ocean, park, restaurant, river, rock_climbing, snow, suburban, sunset, urban, and water. Furthermore, a scene image can be labeled and associated with more than one scene type. For example, an ocean-beach scene image has both a beach type and a shore type. Multiple scene types for an image are ordered by, for example, a confidence level provided by a human viewer.

Figure 19:
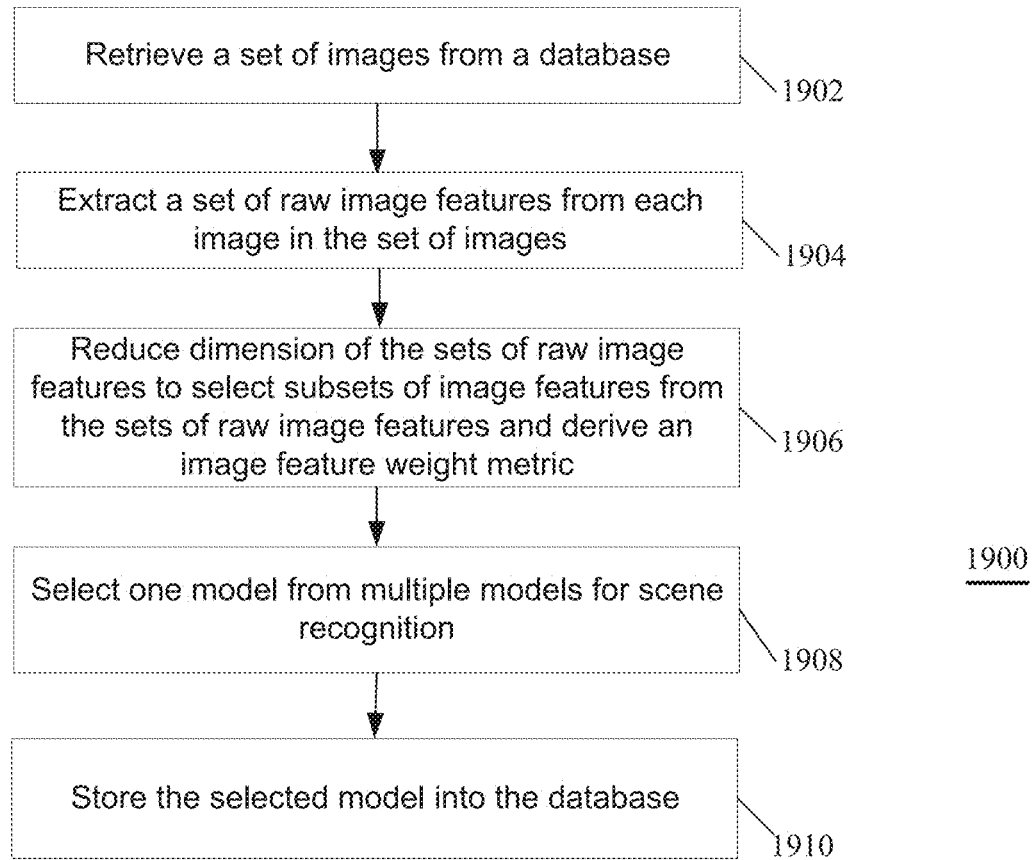
FIG. 19 is a flowchart depicting a process by which an image processing computer extracts image features and weights from a set of known images in accordance with the teachings of this disclosure.

Extraction of the distance metric is further illustrated by reference to a training process 1900 as shown in FIG. 19. Referring now to FIG. 19, at 1902, the software application retrieves the set of images from the database 1604. In one implementation, the set of images are categorized by scene types. At 1904, the software application extracts a set of raw image features (such as color histogram and LBP image features) from each image in the set of images. Each set of raw image features contains the same number of image features. Additionally, the image features in each set of raw image features are of the same types of image features. For example, the respective first image features of the sets of raw image features are of the same type of image feature. As an additional example, the respective last image features of the sets of raw image features are of the same type of image feature. Accordingly, the sets of raw image features are termed herein as corresponding sets of image features.

Each set of raw image features generally includes a large number of features. Additionally, most of the raw image features incur expensive computations and/or are insignificant in scene understanding. Accordingly, at 1906, the software application performs a dimension reduction process to select a subset of image features for scene recognition. In one implementation, at 1906, the software application applies the PCA algorithm on the sets of raw image features to select corresponding subsets of image features and derive an image feature weight for each image feature in the subsets of image features. The image feature weights comprise an image feature weight metric. In a different implementation, the software application applies the LDA on the sets of raw image features to select subsets of image features and derive corresponding image feature weights.

The image feature weight metric, which is derived from selected subset of image features, is referred to herein as a model. Multiple models can be derived from the sets of raw image features. Different models are usually trained by different subsets of image features and/or image feature. Therefore, some models may more accurately represent the sets of raw images than other models. Accordingly, at 1908, a cross-validation process is applied to a set of images to select one model from multiple models for scene recognition. Cross-validation is a technique for assessing the results of scene understanding of different models. The cross-validation process involves partitioning the set of images into complementary subsets. A scene understanding model is derived from one subset of images while the subset of images is used for validation.

For example, when the cross-validation process is performed on a set of images, the scene recognition accuracy under a first model is ninety percent (90%) while the scene recognition accuracy under a second model is eighty percent (80%). In such a case, the first mod& more accurately represents the sets of raw images than the second model, and is thus selected over the second model. In one embodiment, the Leave One Out Cross-Validation algorithm is applied at 1908.

At 1910, the software application stores the selected model, which includes an image feature metric and subsets of image features, into the database 1604. In a different implementation, only one model is derived in the training process 1900. In such a case, step 1908 is not performed in the training process 1900.

Turning back to FIG. 17, at 1714, the software application, from the input image, extracts a set of input image features corresponding to the set of image features indicated by the distance metric. As used herein, the set of input image features is said to correspond to the distance metric. At 1716, the software application retrieves a set of image features (generated using the process 1900) for each image in a set of images that are categorized by image scene types. Each of the retrieved sets of image features corresponds to the set of image features indicated by the distance metric. In one implementation, the retrieved sets of image features for the set of images are stored in the database 1604 or the cloud 1632.

At 1718, using the distance metric, the software application computes an image feature distance between the set of input image features and each of the sets of image features for the set of images. In one implementation, an image feature distance between two sets of image features is a Euclidean distance between the two image feature vectors with application of the weights included in the distance metric. At 1720, based on the computed image feature distances, the software application determines a scene type for the input image, and the assignment of the scene type to the input image is written into the database 1604. Such determination process is further illustrated by reference to FIGS. 18A and 18B.

Figure 18A:
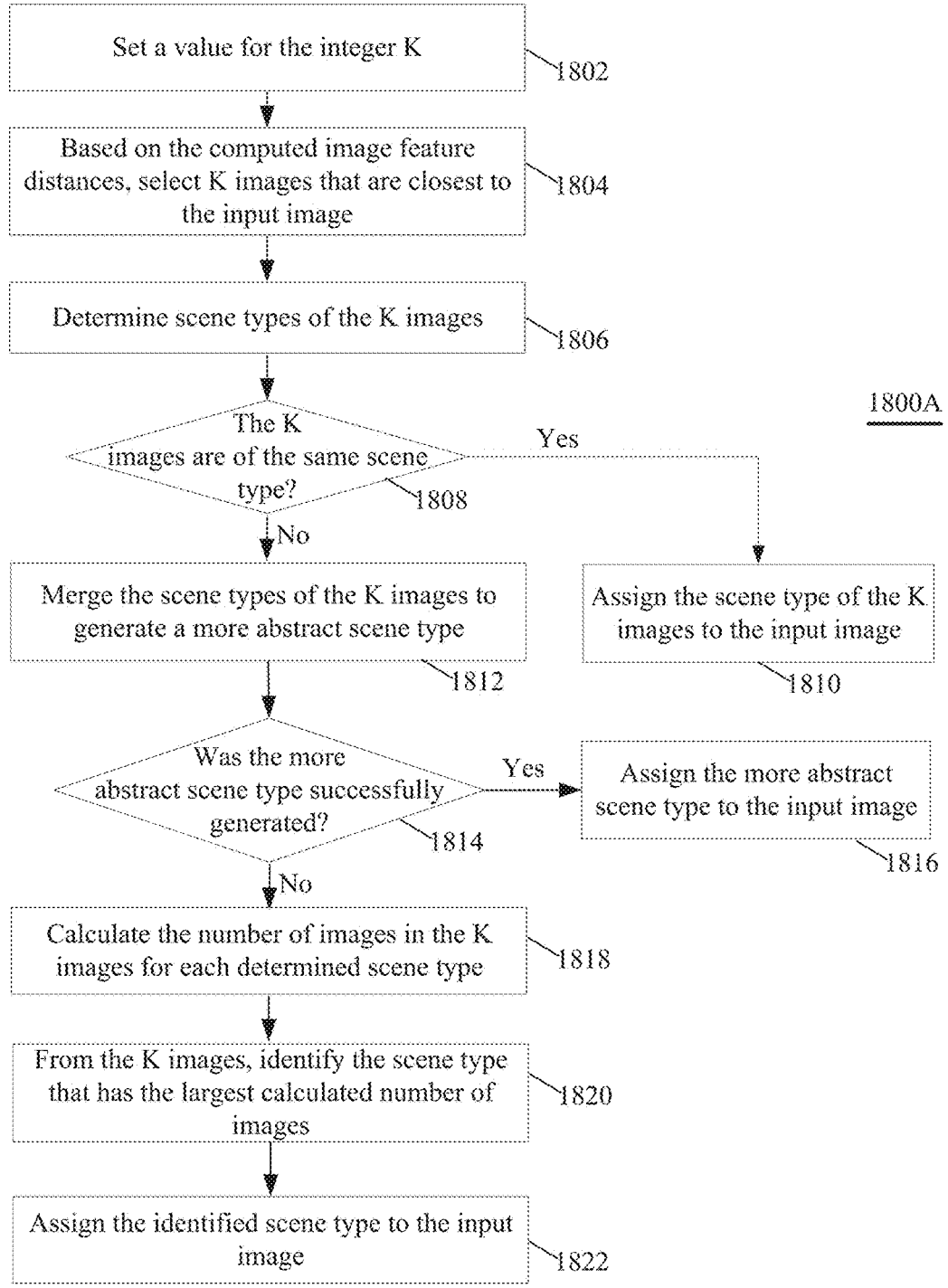
FIG. 18A is a flowchart depicting a process by which an image processing computer determines a scene type for an image in accordance with the teachings of this disclosure.

Turning to FIG. 18A, a process 1800A for selecting a subset of images for accurate image recognition is shown. In one implementation, the software application utilizes a KNN algorithm to select the subset of images. At 1802, the software application sets a value (such as five or ten) for the integer K. At 1804, the software application selects K smallest image feature distances that are computed at 1716 and the corresponding K images. In other words, the selected K images are the top K matches, and closest to the input image in terms of the computed image feature distances. At 1806, the software application determines scene types (such as a beach resort or a mountain) of the K images. At 1808, the software application checks whether the K images have the same scene image type. If so, at 1810, the software application assigns the scene type of the K images to input image.

Otherwise, at 1812, the software application applies, for example, Natural Language Processing technologies to merge the scene types of the K images to generate a more abstract scene type. For example, one half of the K images is of ocean-beach type while the other half is of lake-shore type, the software application generates a shore type at 1812. Natural Language Processing is described in "Artificial Intelligence, a Modern Approach," Chapter 23, Pages 691-719, Russell, Prentice Hall, 1995, which is hereby incorporated by reference to materials filed herewith. At 1814, the software application checks whether the more abstract scene type was successfully generated. If so, at 1816, the software application assigns the more abstract scene type to the input image. In a further implementation, the software application labels each of the K images with the generated scene type.

Turning back to 1814, where the more abstract scene type was not successfully generated, at 1818, the software application calculates the number of images in the K images for each determined scene type. At 1820, the software application identifies the scene type to which the largest calculated number of images belong. At 1822, the software application assigns the identified scene type to the input image. For example, where K is integer ten (10), eight (8) of the K images are of scene type forest, and the other two (2) of the K images are of scene type park, the scene type with the largest calculated number of images is the scene type forest and the largest calculated number is eight. In this case, the software application assigns the scene type forest to the input image. In a further implementation, the software application assigns a confidence level to the scene assignment. For instance, in the example described above, the confidence level of correctly labeling the input image with the scene type forest is eighty percent (80%).

Figure 18B:
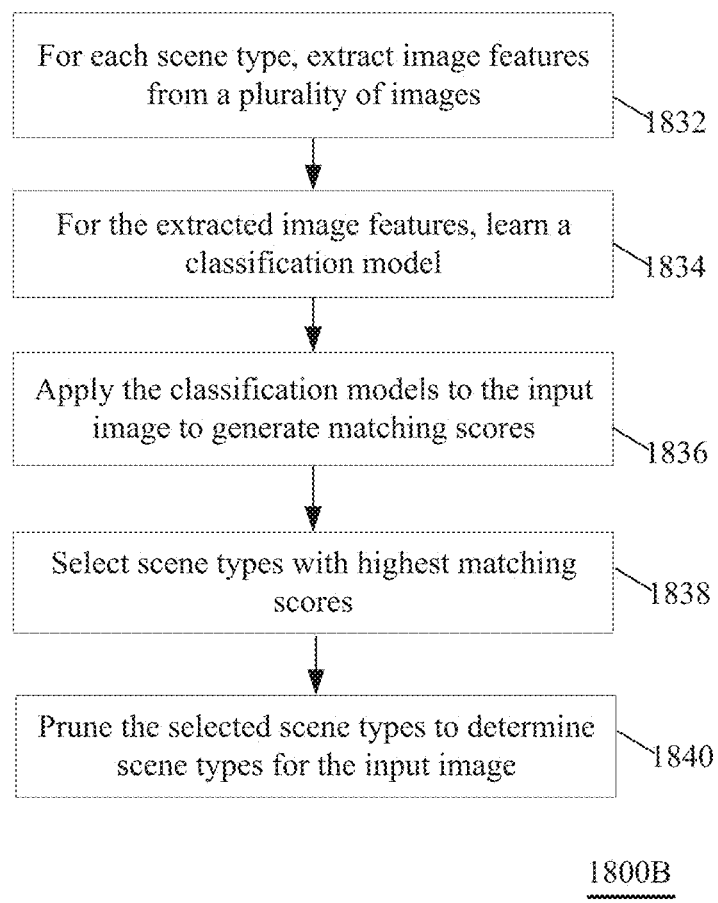
FIG. 18B is a flowchart depicting a process by which an image processing computer determines a scene type for an image in accordance with the teachings of this disclosure.

Alternatively, at 1720, the software application determines the scene type for the input image by performing a discriminative classification method 1800B as illustrated by reference to FIG. 18B. Referring now to FIG. 18B, at 1832, the software application, for each scene type stored in the database 1604, extracts image features from a plurality of images. For example, ten thousand images of beach type are processed at 1832. The extracted image features for each such image correspond to the set of image features indicated by the distance metric. At 1834, the software application performs machine learning on the extracted image features of a scene type and the distance metric to derive a classification model, such as the well-known Support Vector Machine (SVM). In a different implementation, 1832 and 1834 are performed by a different software application during an image training process.

In a different implementation, at 1720, the software application determines the scene type for the input image by performing elements of both method 1800A and method 1800B. For example, the software application employs the method 1800A to select the top K matching images. Thereafter, the software application performs some elements, such as elements 1836,1838,1840, of the method 1800B on the matched top K images.

At 1836, the derived classification models are applied to the input image features to generate matching scores. In one implementation, each score is a probability of matching between the input image and the underlying scene type of the classification model. At 1838, the software application selects a number (such as eight or twelve) of scene types with highest matching scores. At 1840, the software application prunes the selected scene types to determine one or more scene types for the input image. In one embodiment, the software application performs Natural Language Processing techniques to identify scene types for the input image.

In a further implementation, where a source scene image is segmented into multiple images and scene understanding is performed on each of the multiple images, the software application analyzes the assigned scene type for each of the multiple images and assigns a scene type to the source scene image. For example, where a source scene image is segmented into two images and the two images are recognized as an ocean image and a beach image respectively, the software application labels the source scene image as an ocean_beach type.

Figure 20:
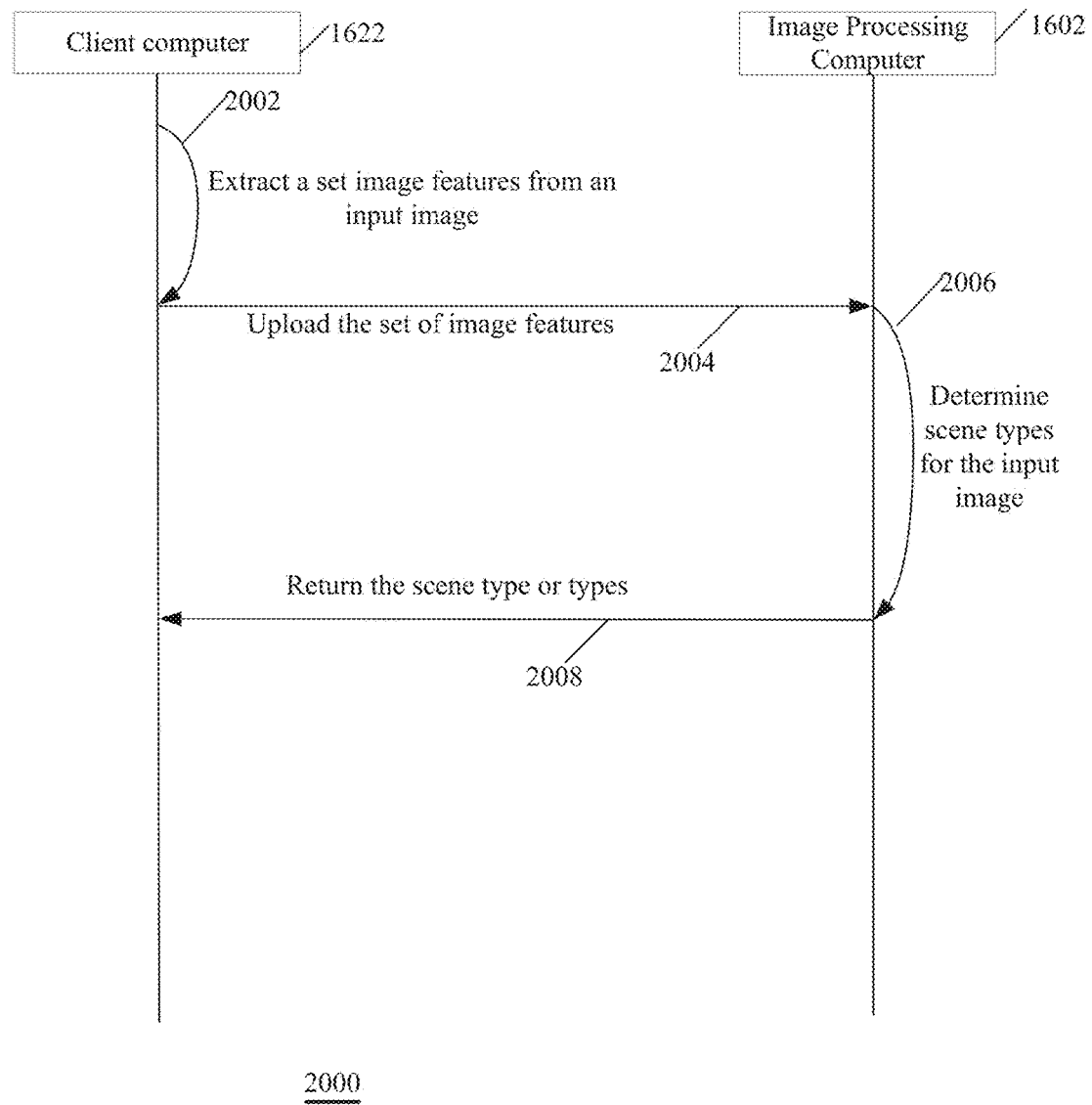
FIG. 20 is a sequence diagram depicting a process by which an image processing computer and a client computer collaboratively recognize a scene image in accordance with the teachings of this disclosure.
Figure 21:
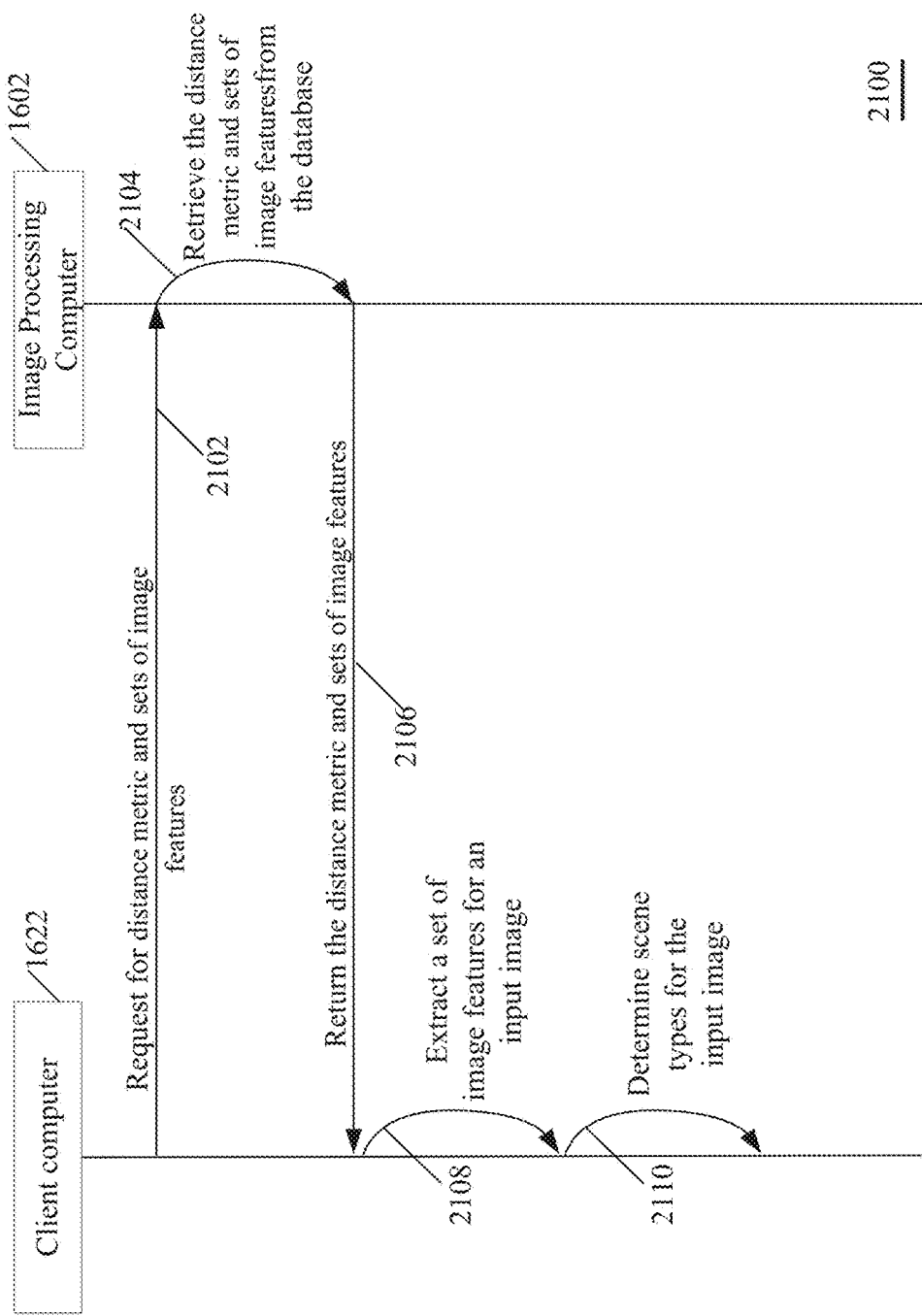
FIG. 21 is a sequence diagram depicting a process by which an image processing computer and a client computer collaboratively recognize a scene image in accordance with the teachings of this disclosure.

In an alternate embodiment of the present teachings, the scene understanding process 1700 is performed using a client-server or cloud computing framework. Referring now to FIGS. 20 and 21, two client-server based scene recognition processes are shown at 2000 and 2100 respectively. At 2002, a client software application running on the computer 1622 extracts a set of image features, which corresponds to the set of input image features extracted at 1714, from an input image. At 2004, the client software application uploads the set of image features to a server software application running on the computer 1602. At 2006, the server software application determines one or more scene types for the input image by performing, for example, 1712,1716,1718,1720 of the process 1700. At 2008, the server software application sends the one or more scene types to the client software application.

In a different implementation as illustrated by reference to a method 2100 as shown in FIG. 21, the client computer 1622 performs most of the processing to recognize a scene image. At 2102, a client software application running on the client computer 1622 sends to the image processing computer 1602 a request for a distance metric and sets of image features for known images stored in the database 1604. Each of the sets of image features corresponds to the set of input image features extracted at 1714. At 2104, a server software application running on the computer 1602 retrieves the distance metric and sets of image features from the database 1604. At 2106, the server software application returns distance metric and sets of image features to the client software application. At 2108, the client software application extracts a set of input image features from an input image. At 2110, the client software application determines one or more scene types for the input image by performing, for example, 1718,1720 of the process 1700.

Figure 22:
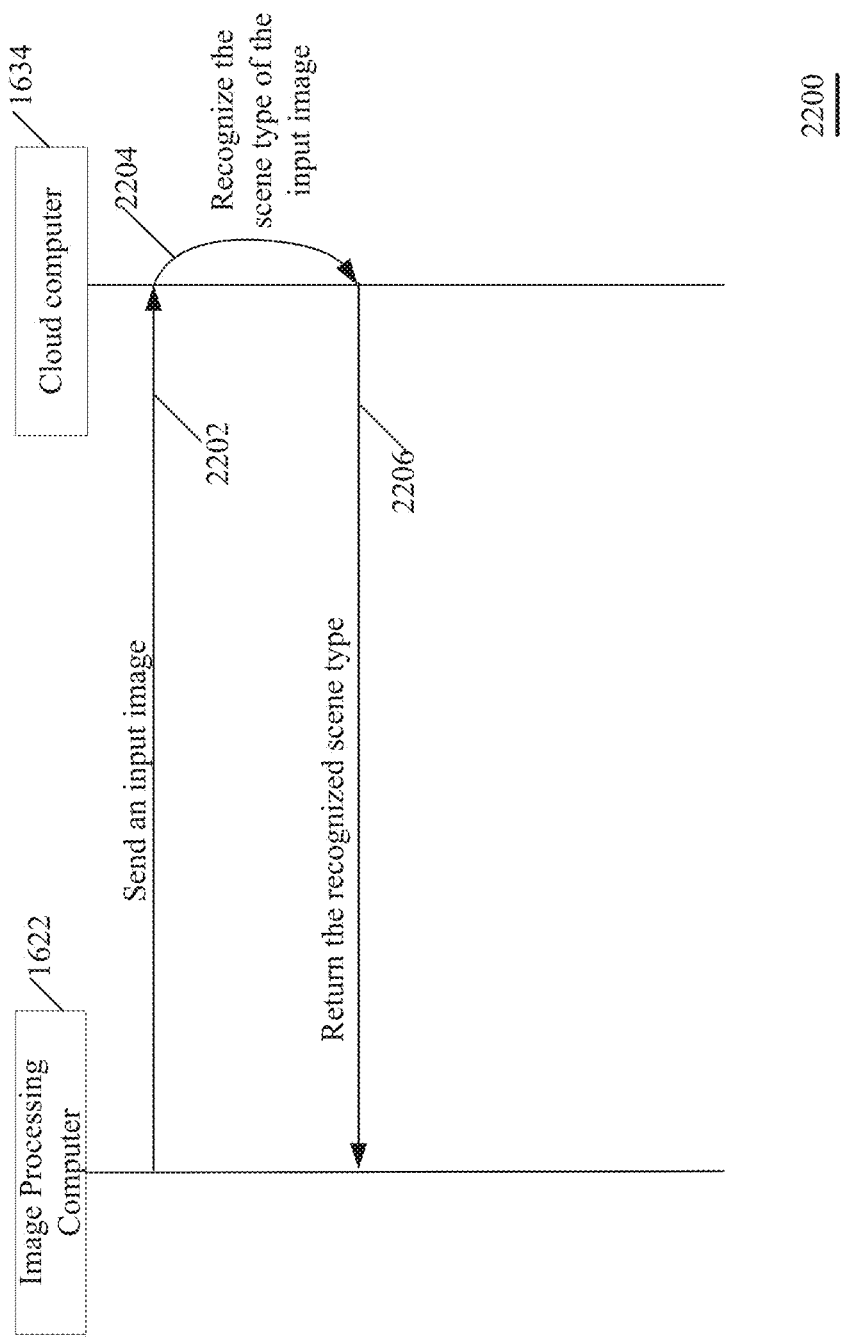
FIG. 22 is a sequence diagram depicting a process by which an image processing computer and a cloud computer collaboratively recognize a scene image in accordance with the teachings of this disclosure.

The scene image understanding process 1700 can also be performed in the cloud computing environment 1632. One illustrative implementation is shown in FIG. 22. At 2202, a server software application running on the image processing computer 1602 sends an input image or a URL to the input image to a cloud software application running on the cloud computer 1634. At 2204, the cloud software application performs elements of the process 1700 to recognize the input image. At 2206, the cloud software application returns the determined scene type(s) for the input image to the server software application.

Figure 23:
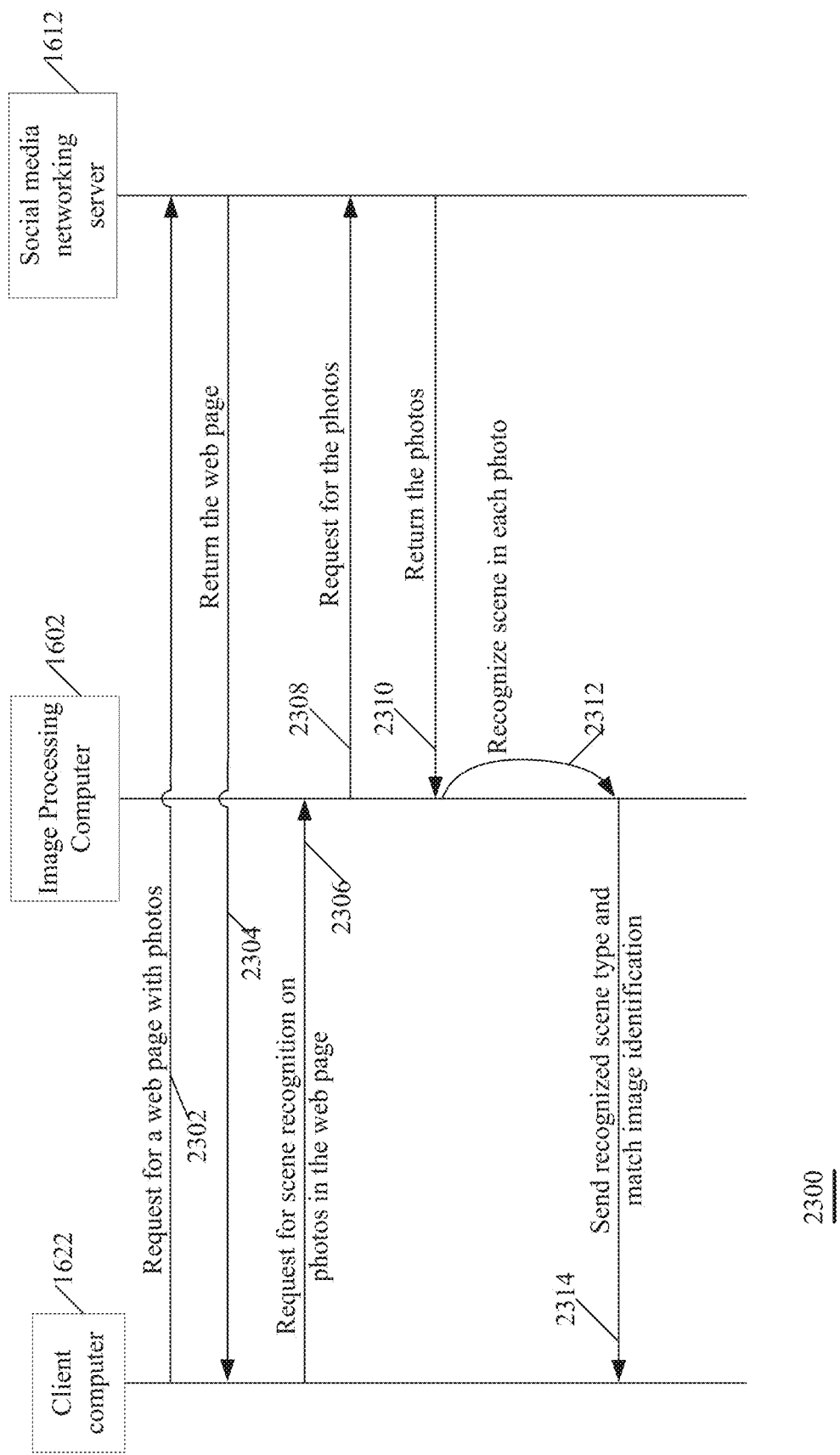
FIG. 23 is a sequence diagram depicting a process by which an image processing computer recognizes scenes in photos posted on a social media networking web page in accordance with the teachings of this disclosure.

Referring now to FIG. 23, a sequence diagram illustrating a process 2300 by which the computer 1602 recognizes scenes in photo images contained in a web page provided by the social media networking server 1612. At 2302, the client computer 1622 issues a request for a web page with one or more photos from the social media networking server 1612. At 2304, the server 1612 sends the requested web page to the client computer 1622. For example, when the client 1620 accesses a Facebook page (such as a home page) using the computer 1622, the computer 1622 sends a page request to a Facebook server. Alternatively, the Facebook server sends back the client's home page upon successful authentication and authorization of the client 1620. When the client 1620 requests the computer 1602 to recognize scenes in the photos contained in the web page, the client 1620, for examples, clicks a URL on the web page or an Internet browser plugin button.

In response to the user request, at 2306, the client computer 1622 requests the computer 1602 to recognize scenes in the photos. In one implementation, the request 2306 includes URLs to the photos. In a different implementation, the request 2306 includes one or more of the photos. At 2308, the computer 1602 requests the photos from the server 1612. At 2310, the server 1612 returns the requested photos. At 2312, the computer 1602 performs the method 1700 to recognize scenes in the photos. At 2314, the computer 1602 sends to the client computer 1622 a recognized scene type and/or identification of matched image for each photo.

Figure 24:
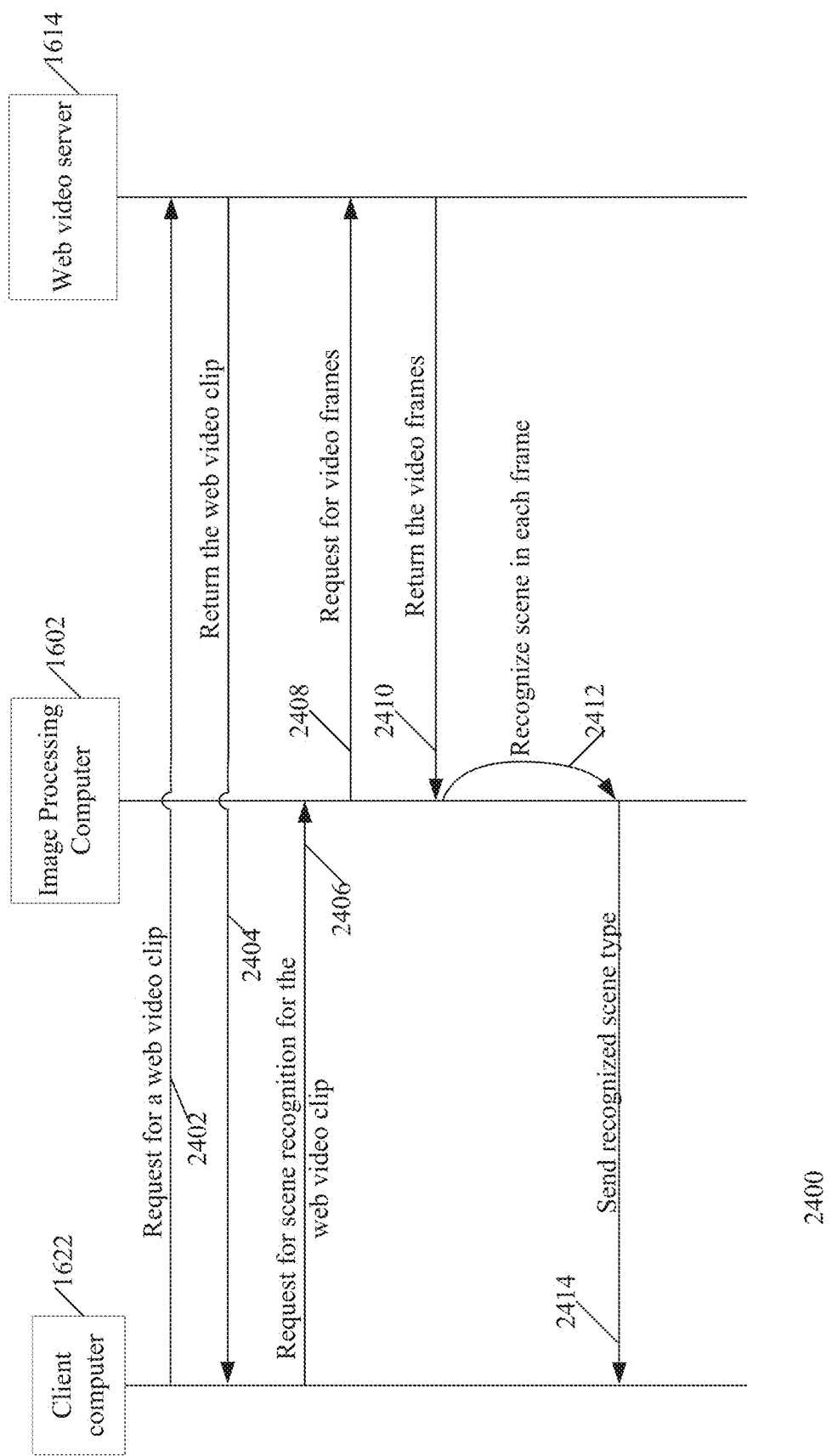
FIG. 24 is a sequence diagram depicting a process by which an image processing computer recognizes scenes in a video clip hosted on a web video server in accordance with the teachings of this disclosure.

Referring the FIG. 24, a sequence diagram illustrating a process 2400 by which the computer 1602 recognizes one or more scenes in a web video clip is shown. At 2402, the computer 1622 sends a request for a web video clip (such as a video clip posted on a YouTube.com server). At 2404, the web video server 1614 returns video frames of the video clip or a URL to the video clip to the computer 1622. Where the URL is returned to the computer 1622, the computer 1622 then requests for video frames of the video clip from the web video server 1614 or a different web video server pointed to by the URL. At 2406, the computer 1622 requests the computer 1602 to recognize one or more scenes in the web video clip. In one implementation, the request 2406 includes the URL.

At 2408, the computer 1602 requests one or more video frames from the web video server 1614. At 2410, the web video server 1614 returns the video frames to the computer 1602. At 2412, the computer 1602 performs the method 1700 on one or more of the video frames. In one implementation, the computer 1602 treats each video frame as a static image and performs scene recognition on multiple video frames, such as six video frames. Where the computer 1602 recognizes a scene type in certain percentage (such as fifty percent) of the processed video frames, the recognized scene type is assumed to be the scene type of the video frames. Furthermore, the recognized scene type is associated with an index range of the video frames. At 2414, the computer 1602 sends the recognized scene type to the client computer 1622.

Figure 25:
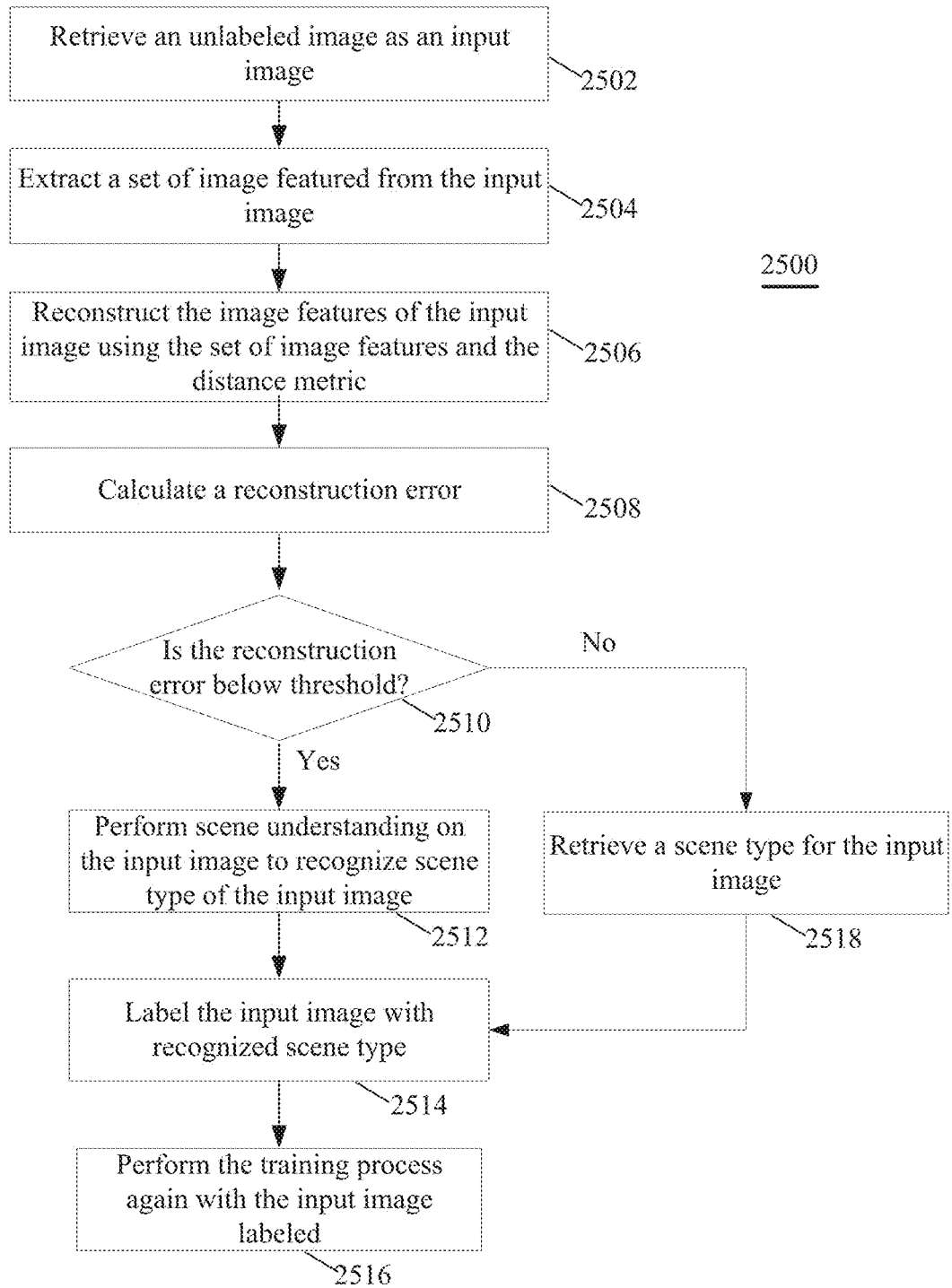
FIG. 25 is a flowchart depicting an iterative process by which an image processing computer refines scene understanding in accordance with the teachings of this disclosure.

In a further implementation, the database 1604 includes a set of images that are not labeled or categorized with scene types. Such uncategorized images can be used to refine and improve scene understanding. FIG. 25 illustrates an iterative process 2500 by which the software application or a different application program refines the distance metric retrieved at 1712, in one example implementation, using the PCA algorithm. At 2502, the software application retrieves an unlabeled or unassigned image from, for example, the database 1604, as an input image. At 2504, from the input image, the software application extracts a set of image features, which corresponds to the distance metric retrieved at 1712. At 2506, the software application reconstructs the image features of the input image using the distance metric and the set of image features extracted at 2504. Such representation can be expressed as follows:

$$x^\mu \approx m + Ey^\mu$$

Figure 4:
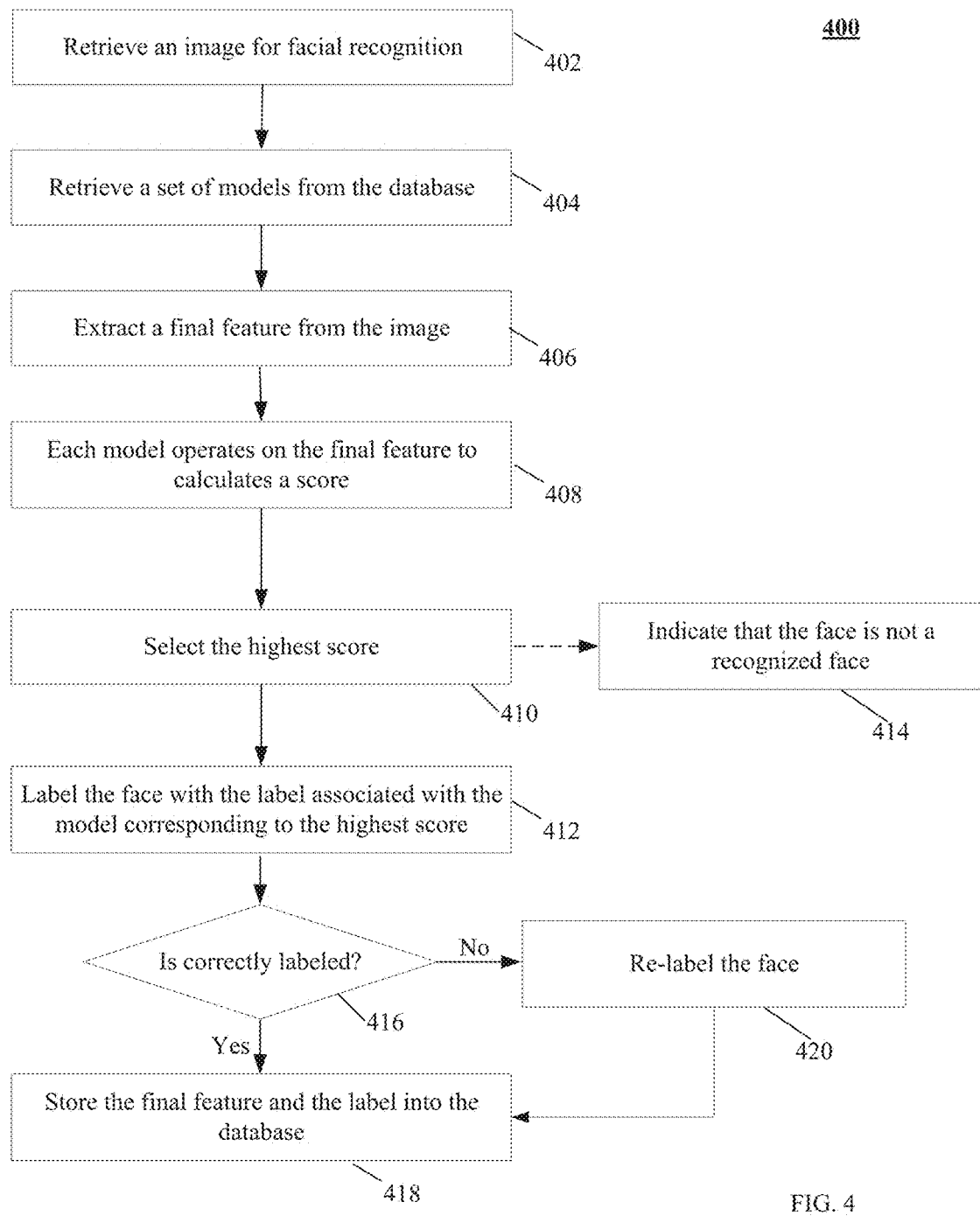
FIG. 4 is a flowchart depicting a process by which a face within an image is recognized in accordance with the teachings of this disclosure.
Figure 5:
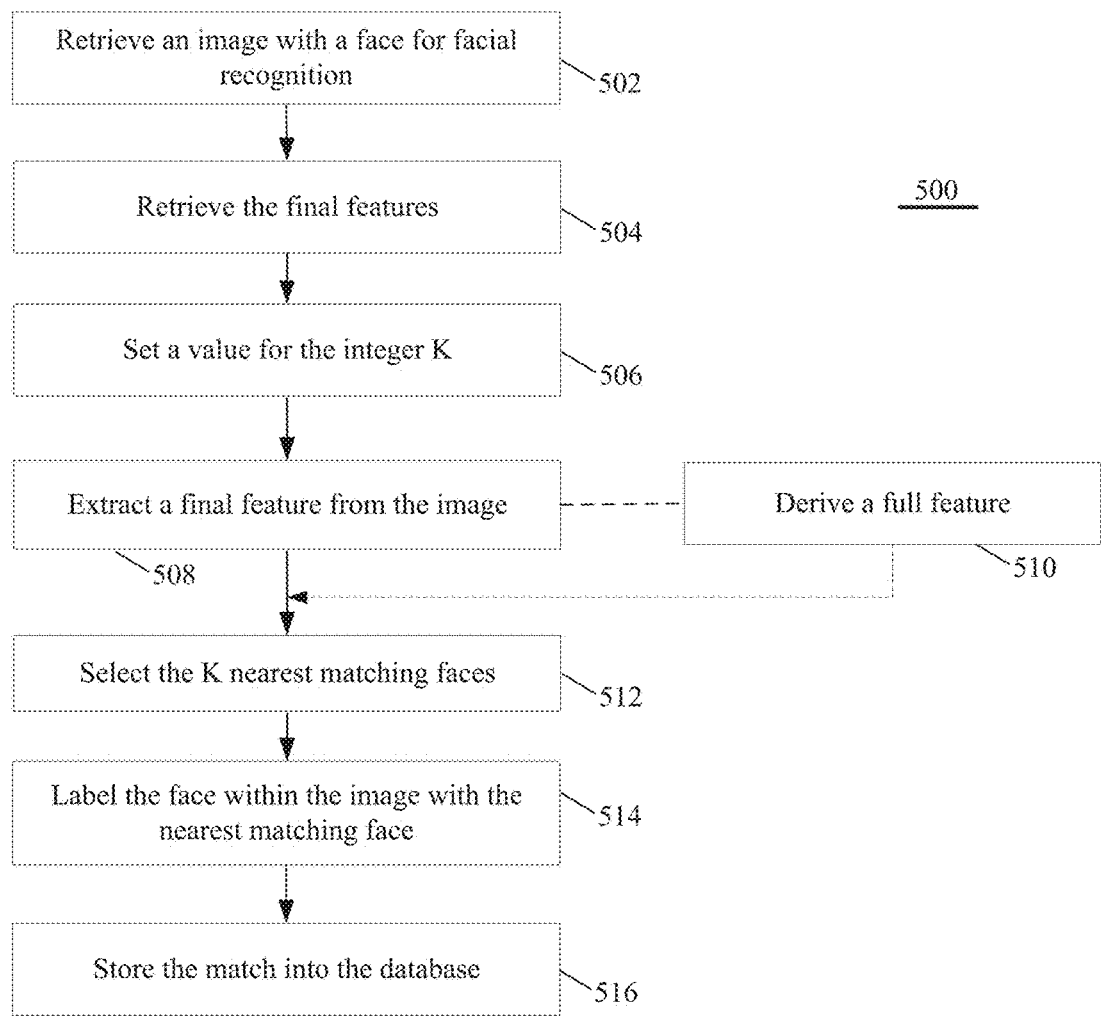
FIG. 5 is a flowchart depicting a process by which a face within an image is recognized in accordance with the teachings of this disclosure.

At 2508, the software application calculates a reconstruction error between the input image and the representation that was constructed at 2506. The reconstruction error can be expressed as follows:

$(P-1)\Sigma_{j=M+1}^{N} \lambda_j$ where $\lambda_{M+1}$ through $\lambda_n$ represent the eigenvalues discarded in performing the process 1900 of FIG. 4 to derive the distance metric.

At 2510, the software application checks whether the reconstruction error is below a predetermined threshold. If so, the software application performs scene understanding on the input image at 2512, and assigns the recognized scene type to the input image at 2514. In a further implementation, at 2516, the software application performs the training process 1900 again with the input image as a labeled image. Consequently, an improved distance metric is generated. Turning back to 2510, where the reconstruction error is not within the predetermined threshold, at 2518, the software application retrieves a scene type for the input image. For example, the software application receives an indication of the scene type for the input image from an input device or a data source. Subsequently, at 2514, the software application labels the input image with the retrieved scene type.

Figure 26:
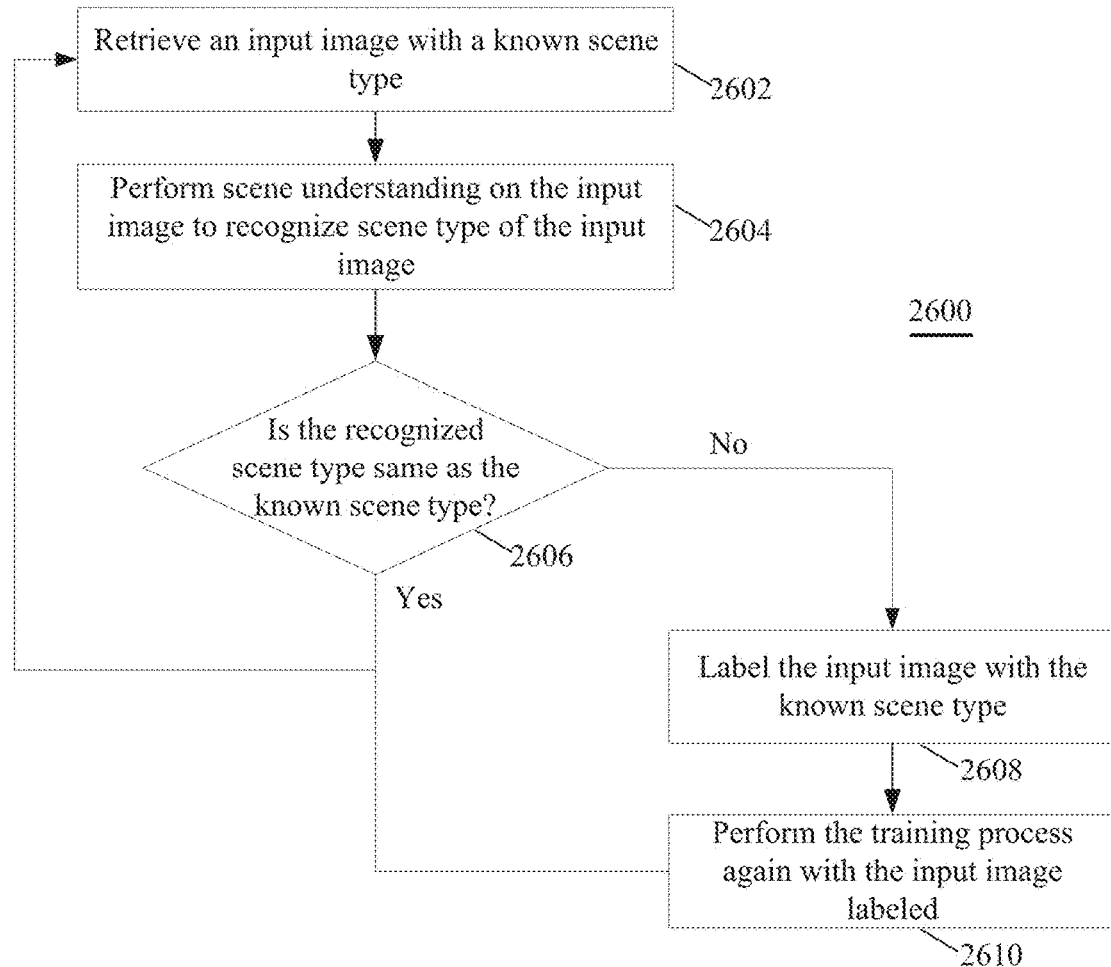
FIG. 26 is a flowchart depicting an iterative process by which an image processing computer refines scene understanding in accordance with the teachings of this disclosure.

An alternate iterative scene understanding process 2600 is shown by reference to FIG. 26. The process 2600 can be performed by the software application on one or multiple images to optimize scene understanding. At 2602, the software application retrieves an input image with a known scene type. In one implementation, the known scene type for the input image is provided by a human operator. For example, the human operator enters or sets the known scene type for the input image using input devices, such as a keyboard and a display screen. Alternatively, the known scene type for the input image is retrieved from a data source, such as a database. At 2604, the software application performs scene understanding on the input image. At 2606, the software application checks whether the known scene type is same as the recognized scene type. If so, the software application transitions to 2602 to retrieve a next input image. Otherwise, at 2608, the software application labels the input image with the known scene type. At 2610, the software application performs the training process 1900 again with the input image labeled with a scene type.

A digital photo often includes a set of metadata (meaning data about the photo). For example, a digital photo includes the following metadata: title; subject; authors; date acquired; copyright; creation time—time and date when the photo is taken; focal length (such as 4 mm); 35 mm focal length (such as 33); dimensions of the photo; horizontal resolution; vertical resolution; bit depth (such as 24); color representation (such as sRGB); camera model (such as iPhone 5); F-stop; exposure time; ISO speed; brightness; size (such as 2.08 MB); GPS (Global Positioning System) latitude (such as 42; 8; 3.00000000000426); GPS longitude (such as 87; 54; 8.999999999912); and GPS altitude (such as 198.36673773987206).

The digital photo can also include one or more tags embedded in the photo as metadata. The tags describe and indicate the characteristics of the photo. For example, a "family" tag indicates that the photo is a family photo, a "wedding" tag indicates that the photo is a wedding photo, a "subset" tag indicates that the photo is a sunset scene photo, a "Santa Monica beach" tag indicates that the photo is a taken at Santa Monica beach, etc. The GPS latitude, longitude and altitude are also referred to as a GeoTag that identifies the geographical location (or geolocation for short) of the camera and usually the objects within the photo when the photo is taken. A photo or video with a GeoTag is said to be geotagged. In a different implementation, the GeoTag is one of the tags embedded in the photo.

Figure 27:
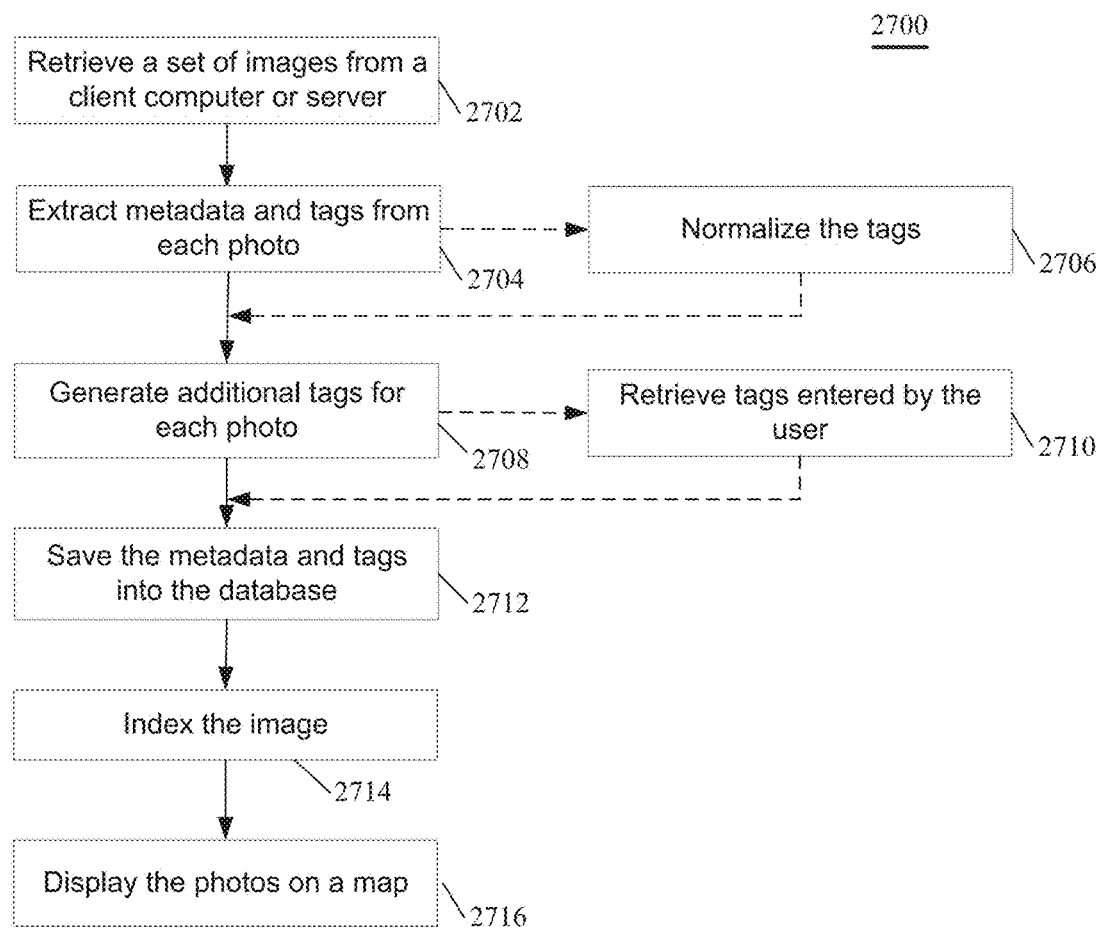
FIG. 27 is a flowchart depicting a process by which an image processing computer processes tags for an image in accordance with the teachings of this disclosure.

A process by which a server software application, running on the server 102, 106, 1602, or 1604, automatically generates an album (also referred to herein as smart album) of photos is shown at 2700 in FIG. 27. It should be noted that the process 2700 can also performed by cloud computers, such as cloud computers 1634,1636,1638. When the user 120 uploads a set of photos, at 2702, the server software application receives the one or more photos from the computer 122 (such as an iPhone 5). The uploading can be initiated by the client 120 using a web page interface provided by the server 102, or a mobile software application running on the computer 122. Alternatively, using the web page interface or the mobile software application, the user 120 provides a URL pointing to his photos hosted on the server 112. At 2702, the server software application then retrieves the photos from the server 112.

Figure 28:
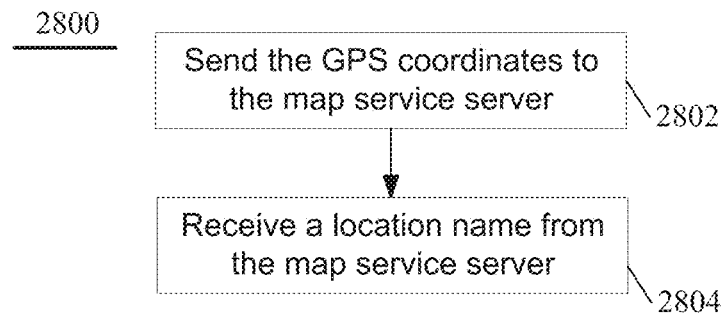
FIG. 28 is a flowchart depicting a process by which an image processing computer determines a location name based on GPS coordinates in accordance with the teachings of this disclosure.

At 2704, the server software application extracts or retrieves the metadata and tags from each received or retrieved photo. For example, a piece of software program code written in computer programming language C# can be used to read the metadata and tags from the photos. Optionally, at 2706, the server software application normalizes the tags of the retrieved photos. For example, both "dusk" and "twilight" tags are changed to "sunset" At 2708, the server software application generates additional tags for each photo. For example, a location tag is generated from the GeoTag in a photo. The location tag generation process is further illustrated at 2800 by reference to FIG. 28. At 2802, the server software application sends the GPS coordinates within the GeoTag to a map service server (such as the Google Map service) requesting for a location corresponding to the GPS coordinates. For example, the location is "Santa Monica Beach" or "O'Hare Airport." At 2804, the server software application receives the name of the mapped-to location. The name of the location is then regarded as a location tag for the photo.

Figure 29:
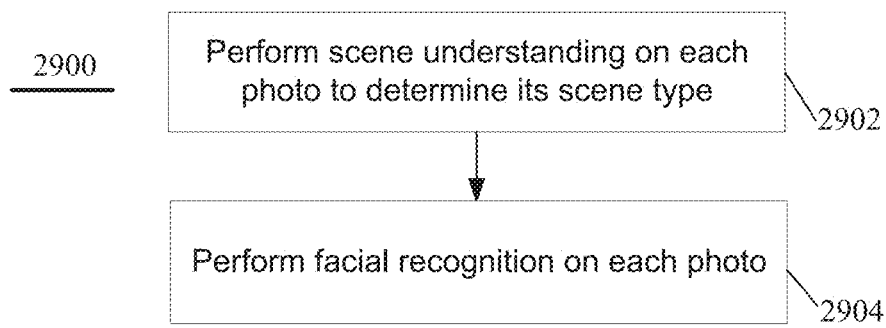
FIG. 29 is a flowchart depicting a process by which an image processing computer performs scene recognition and facial recognition on an image in accordance with the teachings of this disclosure.

As an additional example, at 2708, the server software application generates tags based on results of scene understanding and/or facial recognition that are performed on each photo. The tag generation process is further illustrated at 2900 by reference to FIG. 29. At 2902, the server software application performs scene understanding on each photo retrieved at 2702. For example, the server software application performs steps of the process 1700, 1800A and 1800B to determine the scene type (such as beach, sunset, etc.) of each photo. The scene type is then used as an additional tag (i.e., a scene tag) for the underlying photo. In a further implementation, the photo creation time is used to assist scene understanding. For example, when the scene type is determined to be beach and the creation time is 5:00 PM for a photo, both beach and sunset beach can the scene types of the photo. As an additional example, a dusk scene photo and a sunset scene photo of a same location or structure may look very close. In such a case, the photo creation time helps to determine the scene type, i.e., a dusk scene or a sunset scene.

To further use the photo creation time to assist in scene type determination, the dare of the creation time and geo-location of the photo are considered in determining the scene type. For example, the Sun disappears out of sight from the sky at different times in different seasons of the year. Moreover, sunset times are different for different locations. Geolocation can further assist in scene understanding in other ways. For example, a photo of a big lake and a photo of a sea may look very similar. In such a case, the geo-cations of the photos are used to distinguish a lake photo from an ocean photo.

In a further implementation, at 2904, the server software application performs facial recognition to recognize faces and determine facial expressions of individuals within each photo. In one implementation, different facial images (such as smile, angry, etc.) are viewed as different types of scenes. The server software application performs scene understanding on each photo to recognize the emotion in each photo. For example, the server software application performs the method 1900 on a set of training images of a specific facial expression or emotion to derive a model for this emotion. For each type of emotion, multiple models are derived. The multiple models are then applied against testing images by performing the method 1700. The model with the best matching or recognition result is then selected and associated with the specific emotion. Such process is performed for each emotion.

At 2904, the server software application further adds an emotion tag to each photo. For example, when the facial expression is smile for a photo, the server software application adds a "smile" tag to the photo. The "smile" tag is a facial expression or emotion type tag.

Turning back to FIG. 27, as still a further example, at 2708, the server software application generates a timing rag. For example, when the creation time of the photo is on July $4^{th}$ or December $25^{th}$, a "July 4th" tag or a "Christmas" tag is then generated. In one implementation, the generated tags are not written into the file of the photo. Alternatively, the photo file is modified with the additional tags. In a further implementation, at 2710, the server software application retrieves tags entered by the user 120. For example, the server software application provides a web page interface allowing the user 120 to tag a photo by entering new tags. At 2712, the server software application saves the metadata and tags for each photo into the database 104. It should be noted that the server software application may not write each piece of metadata of each photo into the database 104. In other words, the server software application may selectively write photo metadata into the database 104.

In one implementation, at 2712, the server software application stores a reference to each photo into the database 104, while the photos are physical files stored in a storage device different from the database 104. In such a case, the database 104 maintains a unique identifier for each photo. The unique identifier is used to locate the metadata and tags of the corresponding photo within the database 104. At 2714, the server software application indexes each photo based its tags and/or metadata. In one implementation, the server software application indexes each photo using a software utility provided by database management software running on the database 104.

Figure 30:
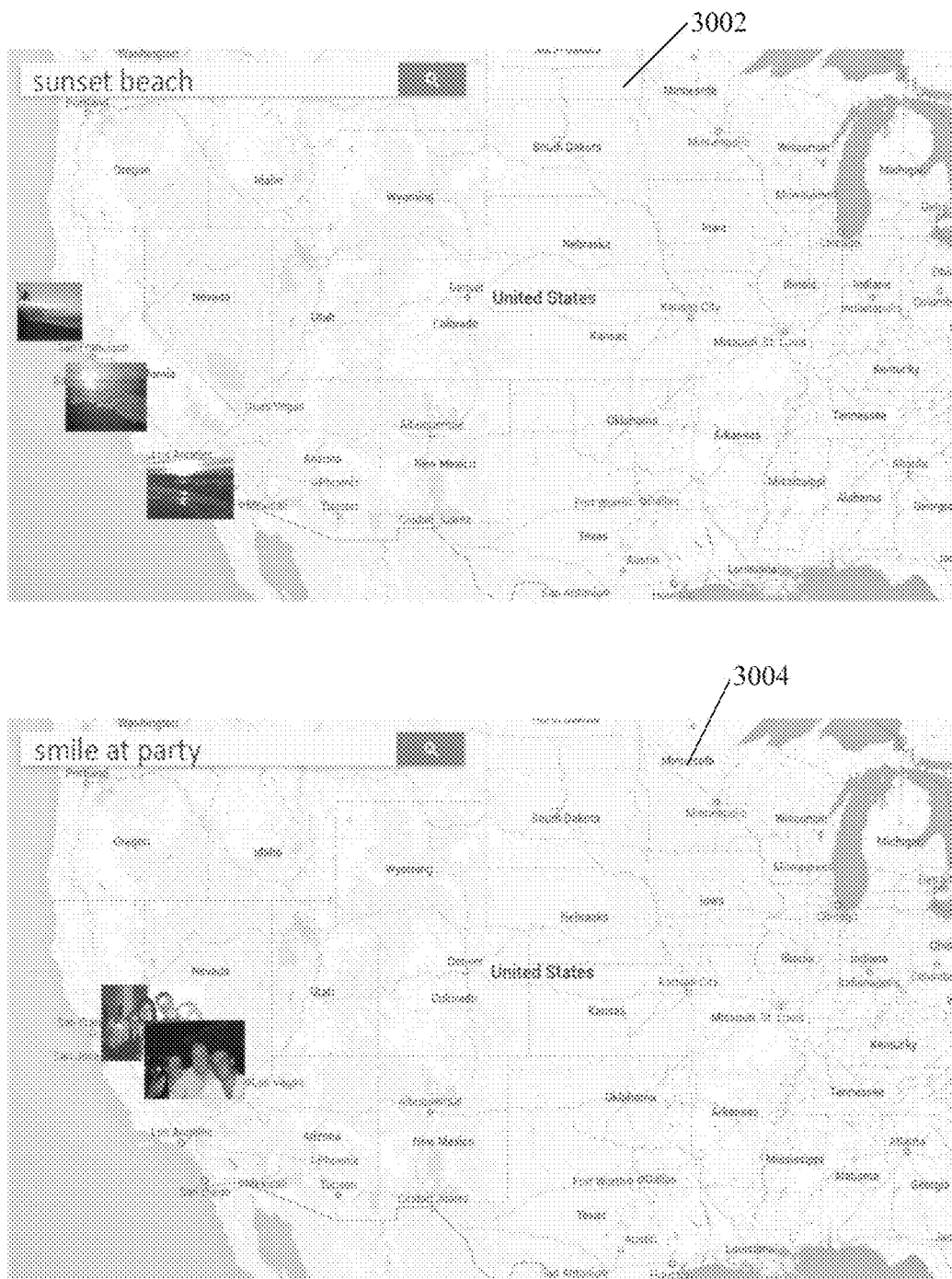
FIG. 30 are two sample screenshots showing maps with photos displayed on the maps in accordance with the teachings of this disclosure.

At 2716, the server software application displays the photos, retrieved at 2702, on a map based on the GeoTags of the photos. Alternatively, at 2716, the server software application displays a subset of the photos, retrieved at 2702, on the map based on the GeoTags of the photos. Two screenshots of the displayed photos are shown at 3002 and 3004 in FIG. 30. The user 120 can use zoom-in and zoom-out controls on the map to display photos within certain geographical area. After the photos have been uploaded and indexed, the server software application allows the user 120 to search for his photos, including the photos uploaded at 2702. An album can then be generated from the search result (i.e., a list of photos). The album generation process is further illustrated at 3100 by reference to FIG. 31. At 3102, the server software application retrieves a set of search parameters, such as scene type, facial expression, creation time, different tags, etc. The parameters are entered through, for example a web page interface of the server software application or a mobile software application. At 3104, the server software application formulates a search query and requests the database 104 to execute the search query.

In response, the database 104 executes the query and returns a set of search results. At 3106, the server software application receives the search results. At 3108, the server software application displays the search results on, for example, a web page. Each photo in the search result list is displayed with certain metadata and/or tags, and the photo in certain size (such as half of original size). The user 120 then clicks a button to create a photo album with the returned photos. In response to the click, at 3110, the server software application generates an album containing the search results, and stores the album into the database 104. For example, the album in the database 104 is a data structure that contains the unique identifier of each photo in the album, and a title and description of the album. The title and description are entered by the user 120 or automatically generated based on metadata and tags of the photos.

In a further implementation, after the photos are uploaded at 2702, the server software application or a background process running on the server 102 automatically generates one or more albums including some of the uploaded photos. The automatic generation process is further illustrated at 3200 by reference to FIG. 32. At 3202, the server software application retrieves the tags of the uploaded photos. At 3204, the server software application determines different combinations of the tags. For example, one combination includes "beach," "sunset," "family vacation," and "San Diego Sea World" tags. As an additional example, the combinations are based on tag types, such as timing tags, location tags, etc. Each combination is a set of search parameters. At 3206, for each tag combination, the server software application selects (such as by querying the database 104) photos from, for example, the uploaded photos, or the uploaded photos and existing photos, that each contain all the tags in the combination. In a different implementation, the photos are selected based metadata (such as creation time) and tags.

At 3208, the server software application generates an album for each set of selected photos. Each of the albums includes, for example, a title and/or a summary that can be generated based on metadata and tags of photos within the album. At 3210, the server software application stores the albums into database 104. In a further implementation, the server software application displays one or more albums to the user 120. A summary is also displayed for each displayed album. Additionally, each album is shown with a representative photo, or thumbnails of photos within the album.

Obviously, many additional modifications and variations of the present disclosure are possible in light of the above teachings. Thus, it is to be understood that, within the scope of the appended claims, the disclosure may be practiced otherwise than is specifically described above. For example, the database 104 can include more than one physical database at a single location or distributed across multiple locations. The database 104 can be a relational database, such as an Oracle database or a Microsoft SQL database. Alternatively, the database 104 is a NoSQL (Not Only SQL) database or Google's Bigtable database. In such a case, the server 102 accesses the database 104 over an Internet 110. As an additional example, the servers 102 and 106 can be accessed through a wide area network different from the Internet 110. As still further an example, the functionality of the servers 1602 and 1612 can be performed by more than one physical server; and the database 1604 can include more than one physical database.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or dams below, the additional inventions are not dedicated to the public and the right to file one or more applications to claim such additional inventions is reserved.

What is claimed is:

1. An image processing system comprising:
   an image processing computer coupled to a wide area network and to an image source computer; and one or more processors configured to perform actions, including to:
generate an image distance metric from a set of images, wherein the image distance metric indicates image feature weights corresponding to image features associated with the set of images;
retrieve an input image;
extract a first set of input image features from the input image, wherein
the first set of input image features corresponds to the image distance metric;
extract a set of image features from individual ones of images in the set of images, wherein set of image features corresponds to the image distance metric;
using the image distance metric, compute one or more image feature distances between the first set of input image features and individual ones of the set of image features;
select, from the set of images, a subset of images based at least in part on image feature distances, the subset of images corresponding to a set of scene types;
determine a scene type from the set of scene types; and
assign the scene type to the input image.

2. The image processing system of claim 1, wherein the image distance metric indicates a second set of image features and a set of image feature weights corresponding to the second set of image features.

3. The image processing system of claim 1, wherein the actions further include to retrieve a source scene image via a network interface and segment the source scene image into multiple images, wherein the multiple images include the input image.

4. The image processing system of claim 3, wherein the actions further include to:
recognize scene types of one or more of the multiple images; and
based at least in part on the scene types, determine a scene type for the source scene image.

5. The image processing system of claim 1, wherein: the set of input image features includes an estimated depth of the input image; and the first set of image features for individual ones of the images in the set of images includes an estimated depth of the image.

6. The image processing system of claim 1, wherein the actions further include to send the image distance metric to a client computer.

7. The image processing system of claim 6, wherein the actions further include to send the first set of image features for individual ones of the images in the set of images to the client computer.

8. The image processing system of claim 1, wherein the actions further include to receive the first set of image features for the input image from a client computer.

9. The image processing system of claim 1, wherein the actions further include to retrieve the input image via a network interface coupled to the image processing computer.

10. The image processing system of claim 1, wherein the image processing system is a distributed computing system.

11. The image processing system of claim 10, wherein the image processing system is a cloud computing system.

12. The image processing system of claim 1, wherein the actions further include to:
extract a set of raw image features for individual ones of the images in the set of images; and
reduce dimensionality of the sets of raw image features to derive the image features and the image feature weights.

13. The image processing system of claim 12, wherein the actions further include to:
perform scene understanding on an unlabeled image to match a scene type to the unlabeled image;
determine that the scene type is accurate;
label the unlabeled image with the scene type to generate a labeled image; and
generate a refined image distance metric from the set of images and the labeled image.

14. The image processing system of claim 1, wherein the actions further include to:
based at least in part on the image distance metric, learn a classification model from a plurality of images of each scene type in a list of scene types;
apply the classification model to the input image to generate a set of matching scores; and
based on the set of matching scores, select the subset of images.

15. A method comprising:
generating an image distance metric from a set of images, wherein the image distance metric indicates image feature weights corresponding to image features;
retrieving an input image;
extracting a first set of input image features from the input image, wherein the first set of input image features corresponds to the image distance metric;
extracting a set of image features from each image in the set of images, wherein extracted sets of image features corresponds to the image distance metric;
computing, based at least in part on the image distance metric, one or more image feature distances between the first set of input image features and individual ones of the extracted sets of image features;
selecting, from the set of images, a subset of images based at least in part on the one or more image feature distances, the subset of images corresponding to a set of scene types;
determining a scene type from the set of scene types; and
assigning the scene type to the input image.

16. The method of claim 15, wherein the image distance metric indicates a second set of image features and a set of image feature weights corresponding to the second set of image features.

17. The method of claim 16, further comprising retrieving a source scene image via a network interface and segmenting the source scene image into multiple images.

18. The method of claim 17, further comprising:
recognizing scene types of one or more of the multiple images; and
determining, based at least in part on the scene types, a scene type for the source scene image.

19. The method of claim 16, wherein: the set of input image features includes an estimated depth of the input image and the first set of image features for individual ones of the images in the set of images includes an estimated depth of the image.

20. The method of claim 17, further comprising,
learning, based at least in part on the image distance metric, a classification model from a plurality of images of individual scene types in a list of scene types;
applying the classification model to the input image to generate a set of matching scores; and
selecting, based at least in part on the set of matching scores, the subset of images.

* * * * *